United States Patent
Dini et al.

(10) Patent No.: US 8,180,922 B2
(45) Date of Patent: May 15, 2012

(54) LOAD BALANCING MECHANISM USING RESOURCE AVAILABILITY PROFILES

(75) Inventors: Cosmin Dini, San Jose, CA (US); Petre Dini, San Jose, CA (US); Manuela Popescu, San Jose, CA (US); Anurag Kahol, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 780 days.

(21) Appl. No.: 11/323,038

(22) Filed: Dec. 29, 2005

(65) Prior Publication Data

US 2006/0106938 A1     May 18, 2006

Related U.S. Application Data

(63) Continuation-in-part of application No. 10/714,192, filed on Nov. 14, 2003, and a continuation-in-part of application No. 10/956,286, filed on Oct. 1, 2004.

(51) Int. Cl.
    *G06F 15/173*       (2006.01)
    *G06F 9/46*          (2006.01)

(52) U.S. Cl. ........ 709/241; 709/225; 709/226; 709/229; 718/100

(58) Field of Classification Search .................. 709/225, 709/226, 232, 235, 238–243
See application file for complete search history.

(56) References Cited

U.S. PATENT DOCUMENTS

| | | | |
|---|---|---|---|
| 4,070,647 A | 1/1978 | Robson | |
| 5,341,477 A * | 8/1994 | Pitkin et al. | ................... 709/226 |
| 5,481,548 A | 1/1996 | Wallace | |
| 6,003,090 A | 12/1999 | Puranik et al. | |
| 6,073,089 A | 6/2000 | Baker et al. | |
| 6,317,775 B1 | 11/2001 | Coile et al. | |
| 6,496,948 B1 | 12/2002 | Smorokinsky | |
| 6,601,084 B1 * | 7/2003 | Bhaskaran et al. | ........... 718/105 |
| 6,629,148 B1 | 9/2003 | Ahmed et al. | |

(Continued)

FOREIGN PATENT DOCUMENTS

JP     2000311130 A   *   11/2000

(Continued)

OTHER PUBLICATIONS

Dongarra-J.;Three tools to help with cluster and grid computing: SANS-Effort, PAPI, and NetSolve.;20020000.;DataStar Documents;2002030,p. 3, pp. xxii+479.*

(Continued)

*Primary Examiner* — Ashok Patel
*Assistant Examiner* — Evans Desrosiers
(74) *Attorney, Agent, or Firm* — Hickman Palermo Truong Becker Bingham Wong LLP

(57) ABSTRACT

Resource availability profiles are received, wherein each resource availability profile describes a resource associated with a server. Each resource is assigned a plurality of weights corresponding to a plurality of policies. The weights are determined by, for each of the plurality of the policies, determining a weight for each resource based a given policy and selected information in the resource availability profiles corresponding to the resources. The method further comprises determining a policy from the plurality of the policies corresponding to a given a context associated with a connection request. A first of the load-balanced servers is selected for the connection request based on the weights assigned to the plurality of resources for the policy for the given context.

46 Claims, 13 Drawing Sheets

U.S. PATENT DOCUMENTS

| | | | |
|---|---|---|---|
| 6,658,473 | B1 | 12/2003 | Block et al. |
| 6,735,548 | B1 | 5/2004 | Huang et al. |
| 6,754,854 | B2 | 6/2004 | Kurrasch |
| 6,785,889 | B1* | 8/2004 | Williams ................ 718/104 |
| 6,996,514 | B2 | 2/2006 | Gruber |
| 7,024,580 | B2 | 4/2006 | Guimbellot et al. |
| 7,035,919 | B1 | 4/2006 | Lee et al. |
| 7,058,717 | B2* | 6/2006 | Chao et al. ............... 709/226 |
| 7,342,900 | B2 | 3/2008 | Xiong et al. |
| 2002/0194251 | A1* | 12/2002 | Richter et al. ............. 709/105 |
| 2003/0005023 | A1 | 1/2003 | Gilbert et al. |
| 2003/0112948 | A1 | 6/2003 | Brown et al. |
| 2003/0158940 | A1* | 8/2003 | Leigh ...................... 709/226 |
| 2004/0019680 | A1* | 1/2004 | Chao et al. ............... 709/226 |
| 2004/0064583 | A1* | 4/2004 | Dani et al. ............... 709/241 |
| 2004/0221191 | A1 | 11/2004 | Porras et al. |
| 2005/0015504 | A1 | 1/2005 | Dorne et al. |
| 2005/0027862 | A1* | 2/2005 | Nguyen et al. ............ 709/225 |
| 2005/0055694 | A1* | 3/2005 | Lee ........................... 718/100 |
| 2005/0152308 | A1 | 7/2005 | Seol et al. |
| 2006/0075275 | A1 | 4/2006 | Dini et al. |
| 2006/0165052 | A1 | 7/2006 | Dini et al. |

FOREIGN PATENT DOCUMENTS

| | | | |
|---|---|---|---|
| JP | 2002269060 A | * | 9/2002 |
| WO | 2007078643 A3 | | 4/2008 |

OTHER PUBLICATIONS

Alan Bivens, Sever/Application State Protocol version 1 (SASPv1), IMB TJ Watson Research Center Internet Draft, Jun. 2004, 33 pages.

Growing Your E-Business with IBM Server Load Balancing and Caching embedded solutions, http://www.networking.ibm.com/nhd/webnav.nsf/pages/white:serverload.html 8 pages.

Dr. Sidney Feit, SNMP, A Guide to Network Management, McGraw-Hill, Inc., 1995, 702 pages.

Harold Ascher, et al., "Repairable Systems Reliability, Modeling, Interference, Misconceptions and Their Causes," Lecture Notes in Statistics, vol. 7, 1984, 239 pages.

Alain Pages, et al., "System Reliability Evaluation & Prediction in Engineering," 1986, 367 pages.

Johnson, Barry W., "Design and Analysis of Fault Tolerant Digital Systems", Addison-Wesley Publishing Co., 1989, 7 pages.

B. Giffo-Schmitt, International Preliminary Report on Patentability, published by WIPO, Geneva, Switzerland, Jul. 1, 2008, 5 pages.

L. W. Young, Written Opinion of the International Searching Authority, published by USPTO, Alexandria, Virginia, Mar. 11, 2008, 4 pages.

* cited by examiner

LOAD BALANCING MECHANISM USING RESOURCE AVAILABILITY PROFILES

RELATED APPLICATIONS

This application is a continuation-in-part of U.S. patent application Ser. No. 10/714,192, filed on Nov. 14, 2003, entitled METHOD AND APPARATUS FOR MEASURING THE AVAILABILITY OF A NETWORK ELEMENT OR SERVICE. This application is a continuation-in-part of U.S. patent application Ser. No. 10/956,286, filed on Oct. 1, 2004, entitled APPROACH FOR CHARACTERIZING THE DYNAMIC AVAILABILITY BEHAVIOR OF NETWORK ELEMENTS. This application is related to U.S. patent application Ser. No. 10/995,453, filed on Nov. 22, 2004, entitled APPROACH FOR DETERMINING THE REAL TIME AVAILABILITY OF A GROUP OF NETWORK ELEMENTS. The content of all these applications is hereby incorporated herein by reference in their entirety for all purposes.

FIELD OF THE INVENTION

The present invention generally relates to load balancing for resource allocation. The invention relates more specifically to a method and apparatus for load balancing based on resource availability profiles.

BACKGROUND OF THE INVENTION

The approaches described in this section could be pursued, but are not necessarily approaches that have been previously conceived or pursued. Therefore, unless otherwise indicated herein, the approaches described in this section are not necessarily prior art to the claims in this application and are not admitted to be prior art by inclusion in this section.

Load balancers are inserted on the path of the traffic between clients and servers making it possible to redirect client requests to the appropriate server and monitor the status of the application on the servers. Load balancing algorithms (predictors) provide load distribution and application high availability. Load balancers provide server health-management capabilities in the sense that they can detect a malfunction of a server or application and take appropriate decisions, such as putting a server out of a rotation pool, sending probes to get server status, or sending incident handling reports to administrative personnel.

Load balancers feature graceful shutdown capability, which enables a server to terminate its connections before being taken out of rotation pool, and "slowstart," which avoids overwhelming a server with incoming connections when the server first enters the rotation pool. The shutdown and startup are based on the information collected on the status of the servers in a rotation.

Load balancers have very rudimentary mechanisms (predictors) to choose one server over another in a given rotation pool. Predictors like round robin and URL hash are computed entirely by the load balancer. Others, such as weighted round robin take into account a weight that is either statically configured or dynamically passed by a server agent such as DFP (Dynamic Feedback Protocol).

DFP empirically calculates a compound metric based on available CPU, memory utilization, disk space, queue length, concurrent connections and thresholds and passes it to the load balancer as a weight. This provides the load balancer with some insight into a server's ability. However, having a weight alone does not empower the load balancer to make sophisticated balancing decisions.

Based on the foregoing, there is a clear need for an improved method for load balancing. Furthermore, there is a need to provide load balancers with a richer set of information upon which to make load balancing decisions. While this section has been described in the context of load balancing of server resources, load balancing is applicable to other resources.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for load balancing based on resource availability profiles is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Resource Availability Profile
3.0 Load Balancer Process
4.0 Example Polices
  A) Example policy comparing two resources
  B) Example policy comparing two instances of same resource
5.0 Agent Collection of Load Balancer Algorithm
6.0 Input to Load Balancer Algorithm
7.0 Current Availability
  7.1 Overview
  7.2 Structural and Functional Overview
  7.3 Implementation Example
8.0 Dynamic Availability
  8.1 Overview
  8.2 Stability Order
  8.3 Instability Order
  8.4 Repeatability Order
  8.5 Multiplicity Order
  8.6 Dynamic Availability Behavior Function
  8.7 Generating And Managing Dynamic Availability Data
9.0 Implementation Mechanisms: Hardware Overview
10.0 Extensions and Alternatives 1.0 Load Balancing Overview The needs identified in the foregoing Background, and other needs and objects that will become apparent for the following description, are achieved in the present invention, which comprises, in one aspect, a method of load balancing requests to servers. Currently, load balancers have no information on asymptotic availability, real-time availability and dynamic real-time availability that, together with other information, will give salient status on the availability profile of a given server.

In accordance with one embodiment, the method comprises receiving a plurality of resource availability profiles, wherein each resource availability profile describes a resource associated with a server. Each resource is assigned a plurality of weights corresponding to a plurality of policies. The weights are determined by, for each of the plurality of the policies, determining a weight for each resource based a given policy and selected information in the resource availability profiles corresponding to the resources. The method further comprises determining a policy from the plurality of the policies corresponding to a given a context associated with a connection request. A first of the load-balanced servers is selected for the connection request based on the weights assigned to the plurality of resources for the policy for the given context.

In other aspects, the invention encompasses a computer apparatus and a computer-readable medium configured to carry out the foregoing steps.

Load Balancing System Overview

Figure 1:
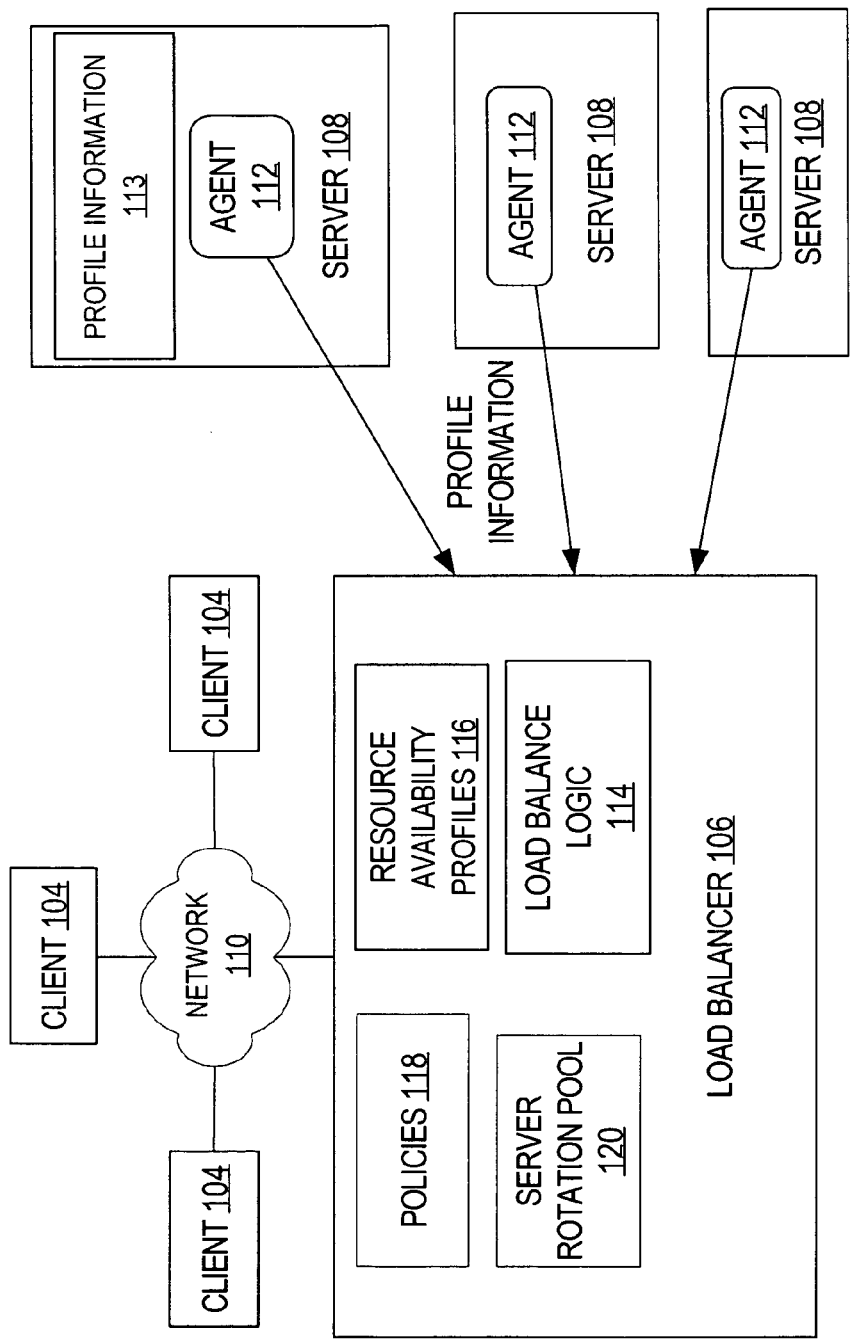
FIG. 1 is a diagram depicting a system having load balancer interposed between clients and servers, in accordance with an embodiment of the present invention.

FIG. 1 is a diagram depicting a system having load balancer 106 interposed between clients 104 and load-balanced servers 108, in accordance with an embodiment of the present invention. The clients 104 access the network 110 in order to make requests that can be satisfied by the servers 108 or software executed thereon. The load balancer 106 requests a connection to one of the servers 108 to load balance resources in order to satisfy the client requests. The resources may include a server, an application running on a server, an object on a server, etc.

The servers 108 have agents 112, which collect information relevant to availability of the server, software executing thereon, or data stored thereon. The agents 112 store the profile information 113 and send the profile information to the load balancer 106 from time to time. An agent 112 sends its profile information to a requesting load balancer 106, in one embodiment. In another embodiment, an agent 112 sends the profile information to the load balancer 106 when the profile information changes. The load balancer 106 stores resource availability profiles 116 based on the profile information. The load balancer 106 may store an instance of a resource availability profile for each server 108. Moreover, the load balancer 106 may store resource availability profiles for applications running on a server 108.

The load balance logic 114 in the load balancer 106 uses the resource availability profiles 116, along with policies 118, to balance the load on the servers 108. The load balancer 106 has a server rotation pool 120 from which one of the servers 108 may be picked to satisfy a client request. For example, the load balance logic 114 requests a connection from one of the servers 108 to satisfy the client request.

2.0 Resource Availability Profile

A "resource availability profile" portrays metrics of interest for driving the load balancers' decision when acting upon the rotation pool 120. The resource availability profiles 116 provide a rich amount of information upon which to base the load balancing decision. The information is more detailed than merely a single value which can serve as a weight to assign a server 108. Rather, the load balancer can use the information in the resource availability profiles to assign multiple weights to the servers 108. The load balancer applies a policy that evaluates one or more of the metrics in the resource availability profiles to assign a weight to each resource for that policy. The load balancer can apply a very wide range of policies to assign different weights to each server.

In one embodiment, a "resource availability profile" includes the following metrics:
  <resource availability profile>::=
    <<liveness>>,
    <security level>,
    <available components>,
    <administrative availability>,
    <connections>,
    <current availability>,
    <dynamic availability>,
    <asymptotic availability>,
    <bind_id>>

The metrics in resource availability profile have the following parameters, in one embodiment:
  liveness::=inservice|noinservice
  security levels::=low|medium|high
  available components::=<CPU, memory, disc space, . . . >
  administrative availability::=<"server="1 . . . 65535, "server port="1 . . . 65535>
  connections::=<conn_number, max_conseq_refusal, timeout>
  current availability::=<real_time_avail, min_avail, avail_tendency>
  dynamic availability::=<stability_index, instab_index, repet_index, multpl_index>
  asymptotic availability::=0.0 . . . 1.0 or [0%, 100%]
  bind_id::<string>

The metrics in the example resource availability profile are defined as follows. Liveness is a measure of whether the resource is in service or not.

The security level metric is a measure of how secure the resource is. For example, different applications could be assigned different security levels. The security levels can be used for enforcing selection rules to determine load balancing if, for example, a client request specifies that a certain security level must be met.

The available components metric specifies components such as, CPU, memory, disc space, etc. Administrative availability in this implementation is a number assigned to a server or a server port. The administrative availability may be an empirical value assigned by an individual acting as an administrator.

The connections metric specifies the number of connections that a server is currently handling. The connection number "conn_number" should be within a minimum connection number (minconns) and a maximum connection number (maxconns). The "max_conseq_refusal" parameter specifies a maximum number of consecutive refusals for a client seeking a connection. The "timeout" parameter specifies a timeout value for client requests that are put into a waiting pool when the connection request is unsatisfied.

The current availability metric comprises a current real availability value (real_time_avail), a minimum availability (min_avail), and an availability tendency (avail_tendency). Further details of the current availability metric are described herein under the heading "Current Availability," and the sub-headings under the Current Availability heading: "Overview," "Structural and Functional Overview," and "Implementation Example." In one embodiment, the current real availability value is a (CRAV) described herein. In one embodiment, the minimum availability is a lowest recorded real availability value (LRAV) described herein. In one embodiment, the availability tendency is a trend indicator described herein The dynamic real-time availability metric comprises a stability index, an instability index, a repeatability index, and a multiplicity index. The stability order index indicates how long an operational state holds with respect to a prior operational state. The instability order index indicates how quickly a network element changes operational states based upon the magnitude of the interval separating consecutive rapid event occurrences. Further details of these indices are described herein under the headings, "Stability Order," "Instability Order," "Repeatability Order," and "Multiplicity Order." In one embodiment, the stability index is the stability order described herein. In one embodiment, the instability index is the instability order described herein. In one embodiment, the repeatability index is the repeatability order described herein. In one embodiment, the multiplicity index is the multiplicity order described herein.

The asymptotic availability metric can be a value between zero and one or a percent between zero and 100. The asymptotic availability can be defined by the vendor of the resource. For example, all servers of a given type may be assigned a given asymptotic availability value by the vendor. The asymptotic availability may also be referred to as steady-state availability or long-run availability. In general, availability can be described as a function of time [A(t)], wherein the value of the function represents the probability that the resource is available at a point in time. The asymptotic availability can be calculated as the value for A(t) as time tends to infinity. In other words, this is where the change in A(t) with respect to time becomes negligible (converges to zero).

A bind_id associates the resource availability profile with a given server, application, etc. The bind_id is configured on a server farm and on a load balancer, in one embodiment. The server agent 112 reports back multiple weights, one per bind id. Thus, a different weight may be assigned to different applications running on the same server.

3.0 Load Balancing Process

Figure 2:
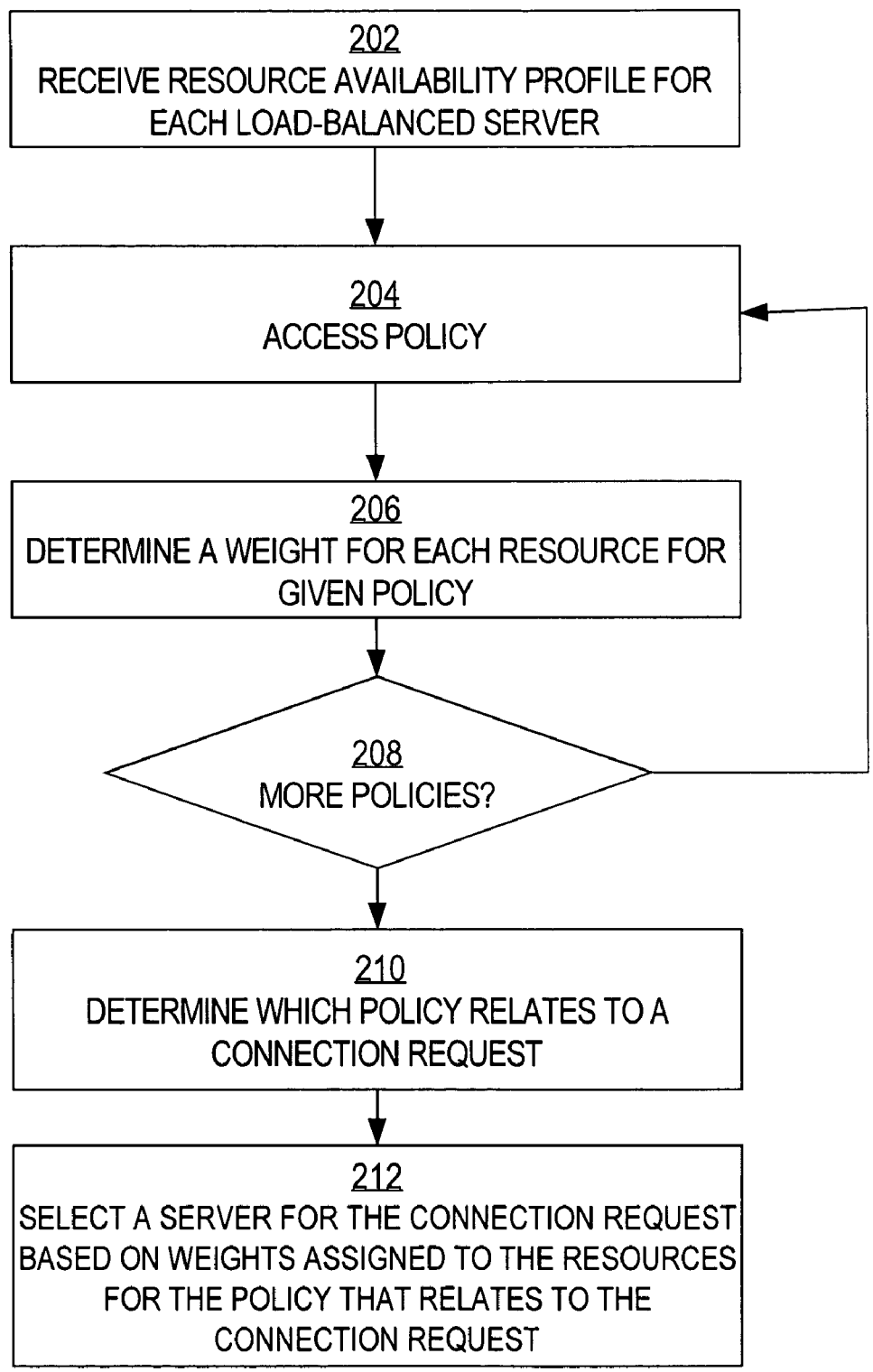
FIG. 2 is flowchart illustrating steps of a process of using resource availability profiles to make load balancing decisions, in accordance with an embodiment of the present invention.
Figure 3:
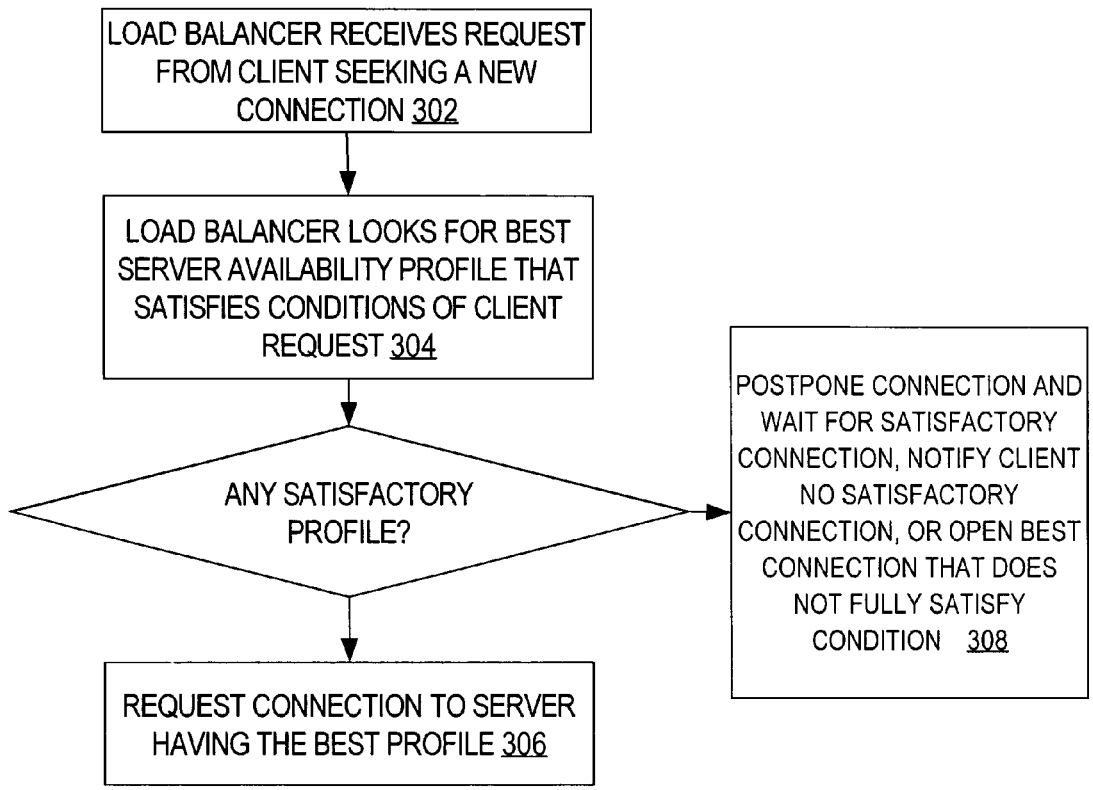
FIG. 3 is a flowchart illustrating steps of a process of a load balancer selecting a server to satisfy a client condition, in accordance with an embodiment of the present invention.
Figure 4:
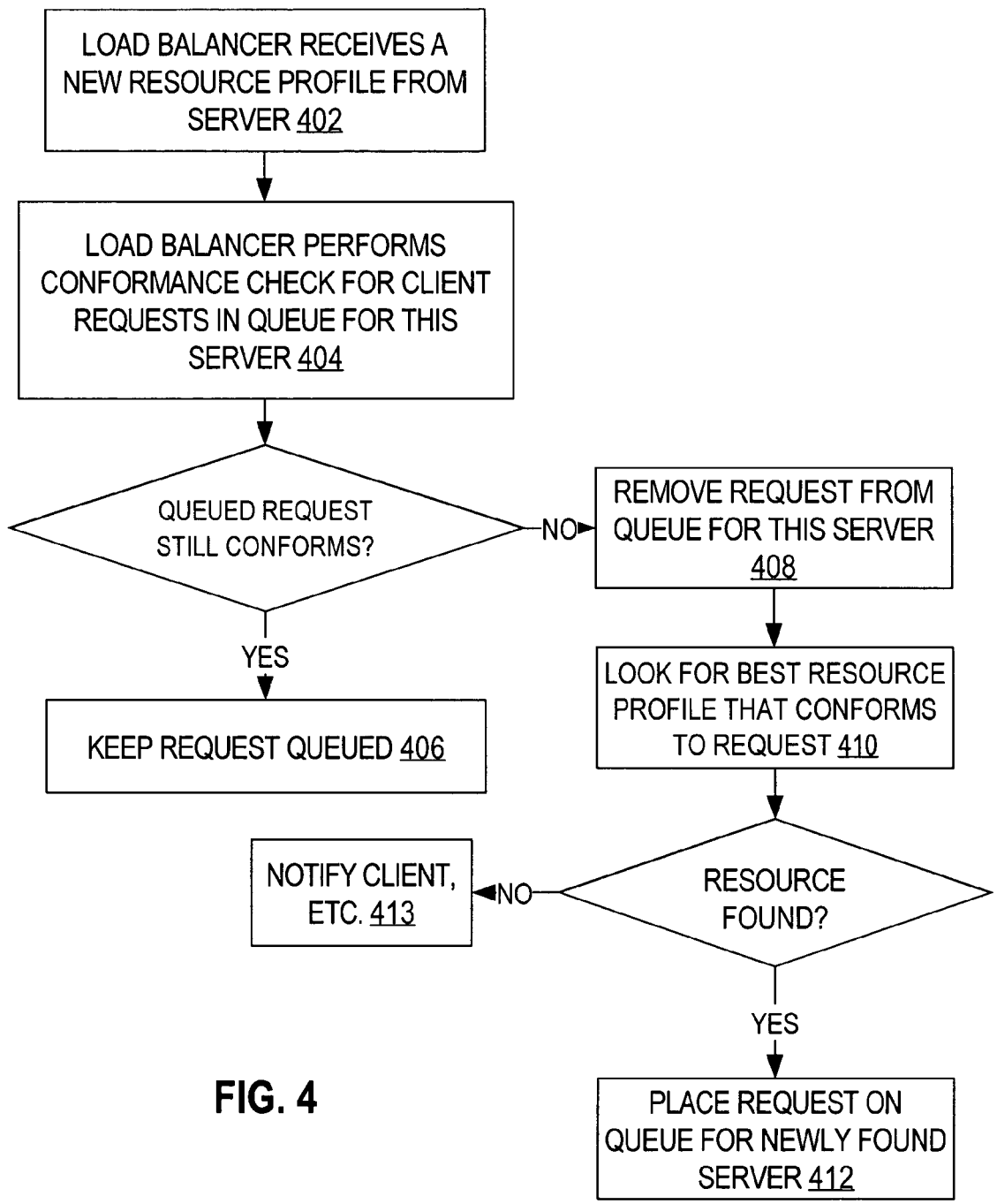
FIG. 4 is a flowchart illustrating steps of a process of a load balancer determining if a connection conforms to a condition after a change to a resource availability profile, in accordance with an embodiment of the present invention.

For purposes of illustrating a clear example, the following discussion of FIG. 2, FIG. 3, and FIG. 4 reference communications among elements of FIG. 1. However, FIG. 1 represents merely one example of a network arrangement, and the techniques described herein may be used in many other network arrangements.

FIG. 2 is a flowchart illustrating a process of balancing loads to resources, based on resource availability profiles, in accordance with one embodiment. Step 202 is receiving, for each server among a plurality of load balanced servers, a resource availability profile for at least one resource associated with each load-balanced server. On the load balancer side, the resource availability profile information allows the load balancer to apply certain load-balancing policies which are not affordable in the current implementations. The load balancer functions in a proactive mode, wherein the load balancer uses the resource availability profile to proactively balance the load among servers, in one aspect. In one embodiment, each resource availability profile comprises a combination of asymptotic availability information, current availability information, and dynamic real-time availability information. The resource availability profile may include other information, such as security level information and connection information, as well. The resource availability profiles may be determined by the agents 112 on the servers 108.

In steps 204-208, a plurality of weights are determined for each resource, wherein each resource is assigned a weight for each policy. In step 204, one of the policies is accessed from the policy store 118. In step 206, a weight is determined for each resource for the policy. Step 206 comprises selecting one or more of the attributes of the resource availability profile to form a policy test.

To process instances of the resource availability profiles, the load balancer uses an "is-better-than" function, in accordance with an embodiment of the present invention. The is-better-than function can be applied to one parameter or a set of parameters from the resource availability profile. A load balancer 106 stores at least one instance of resource availability profile 116 per every server in a server rotation pool 120. Moreover, the load balancer 106 may also store resource availability profiles 116 for applications running on the servers. A load balancer can retain a previous instance of a resource availability profile in order to compare two instances of the profile for the same resource. In one implementation, the load balancer recursively invokes the "is-better-than" function on a finite set (e.g., the server rotation pool 120) to arrive at an "is-best" function.

The load balancer has a set of policies that it activates to evaluate the "is-better-than" function. A load balancer can initiate the "is-better-than" function at a request from a client, at its own initiative, when a particular instance of a resource availability profile shows alarming/abnormal values for some metrics declared of interest in the availability profile schema, or at another time.

In step 208, a determination is made as to which policy related to a connection request.

In step 210, one of the resources is selected for the connection request, based on weights assigned to the resources for the policy that relates to the connection request.

4.0 Example Polices

The following are examples of policies that the load balancer uses, wherein "AP" stands for "resource availability profile"; "s" stands for a server instance in the server rotation pool. The point notation "AP.b" means the metric "b" of the "AP." For example, s3.CPU_avail, means the available CPU of the server s3. The symbol "ooo" stands for "is-better-than."

A) Example Policies Comparing Two Resources

Policy (cpu-first)::=<s1>ooo<s2>iff s1.AP.CPU_avail>s2.AP.CPU_avail.

Policy (asymptotic-availability-first)::=<s1>ooo<s2>iff s1.AP.asy_avail>s2.AP.asy_avail.

Policy (cpu-first or asymptotic-availability-first):: =<s1>ooo<s2>[iff [s1.AP.CPU_avail>s2.AP.CPU_avail] or [s1.AP.asy_avail>s2.AP.asy_avail]].

B) Example Policies Comparing Two Instances of a Resource

Policy (cpu-first)::=AP2<s>ooo AP1<s>iff s.CPU_avail2>s.CPU_avail1 policy (real-time-avail-first):: =AP2<s>ooo AP1<s>iff s.real_time_avail2>s.real_time_avail1.

Policy (cpu-first & real-time-avail-first::=AP2<s>ooo AP1<s>iff[s.CPU_avail2>s.CPU_avail1 & s.real_time_avail2>s.real_time_avail1].

5.0 Agent Collection of Load Balancer Algorithm

The agents 112 collect profile information and adapt the resource availability profile based on the collected information. The agents 112 apply a set of rules to adapt the resource availability profiles. These rules can be executed at any suitable time. In one aspect, the agent implements rules such as these every time a new connection is established or terminated. In another aspect the agent 112 implements rules such as these in response to an event that causes a change to the resource availability profile. The rate at which the rules are re-executed may be a function of other factors, such as the load. In one aspect, the decision to execute the rules is based on values in the resource availability profiles. Following are some examples of rules followed by the agent 112.

1. When the current availability factor of avail_tendency is decreasing, the number of connections should be gradually forced to minconns. For example, the agent 112 will change the behavior of the server 108 to cause the server to refuse connection. For example, if the minnconns parameter is two connections, then agent causes the number of connections to move towards two if the availability factor is tending downward.

2. When the difference between the asymptotic availability and real-time_avail of the current availability metric exceeds a given threshold, a message should be sent to the load balancer.

3. The difference between the asymptotic availability and the administrative availability should be under a given threshold.

4. When conn_number>maxconns and none of the availability indexes exceeds their thresholds, then the maxconns value must be upgraded to the conn_number. In other words, when the current number of connections is greater than the maximum number of connections specified in the resource availability profile, the maximum number of connections specified in the resource availability profile should be updates, unless one of the dynamic availability indexes exceeds its threshold.

5. When the number of max_consec_refusal exceeds a given threshold the administrative_availability is set to minimum.

6. The resource availability profile does not need to be re-computed if the security level in a request exceeds the security level offered by a server.

6.0 Input to Load Balancer Algorithm

The load balancer algorithm can receive input from a variety of sources including: (i) from a client request looking for a new connection, (ii) from a server updating its availability profile, or (iii) from the load balancer itself. For example, the load balancer can update server weights responsive to detecting that a server is no longer in-service, is no longer accepting new connections, or has aborted the current accepted connections.

FIG. 3 is a flowchart illustrating steps of a process of a load balancer selecting a server to satisfy a client condition, in accordance with an embodiment of the present invention. In step 302, the load balancer receives a request from a client. The client request can identify a condition that should be satisfied. For example, the request may specify that a minimum security level must be provided. Another condition might be that all client requests coming from a given subnet are to have a given security level or quality of service. The condition may be based on one or more of the stored policies 118.

In step 304, the load balance logic 114 determines which server in the server pool will best satisfy the client request, based on the resource availability profiles. To determine the best server, the load balance logic 114 applies one or more of the policies 118 to the resource availability profiles 116, in one aspect.

If the load balance logic 114 determines that one of the resource availability profiles meets the condition, then control passes to step 306, where the load balancer 106 request a connection to the selected server.

If the load balance logic 114 determines that none of the resource availability profiles meets the condition, then control passes to step 308. In step 308, the load balancer 106 may (i) reply to the client, (ii) postpone the connection and wait for an availability change and retry, or (iii) select the best server in the rotation of those accepting connections but not fully satisfying the client request.

FIG. 4 is a flowchart illustrating steps of a process of a load balancer determining if a connection conforms to a condition after a change to a resource availability profile, in accordance with an embodiment of the present invention. Prior to this process, the load balancer has queued a number of client requests to be sent to a given server. In step 402, the load balancer receives a new resource profile from the given server. In step 404, the load balancer performs a conformance check for client requests in queue for this server. The conformance check is performed to identify those requests that can be satisfied due to availability profile changes.

If the request can still be satisfied in view of the new availability profile, request is kept on the queue, as indicated in step 406.

If the request cannot be satisfied in view of the new availability profile, then control passes to step 408, wherein the request is removed from the queue for the given server. The load balancer then determines if there is another resource availability profile that can satisfy the client request, in step 410. If the load balancer determines that there is such a resource availability profile, then the load balancer places the request on the queue of the server whose resource profile satisfies the request, in step 412.

If the load balancer determines that there is not another resource profile that satisfies the request, then control passes to step 413, wherein the client may be notified that the request cannot be presently satisfied, the request can be stayed until a satisfactory resource availability profile emerges, or the server with the best resource availability profile that does not satisfy the request is selected.

When a server is not alive, and the load balancer captures this status, the availability profile of that server is updated. In this status, the algorithm is restarted only when the server wakes up and updates its availability profile. In the case of maintenance, it could be a network operator that reinserts it in the rotation pool and (eventually) updates the availability profile.

7.0 Current Availability 7.1 General Overview

The needs identified in the foregoing Background, and other needs and objects that will become apparent for the following description, are achieved in the present invention, which comprises, in one aspect, a method for measuring the availability of a network element or service. For each network element N, a current real availability value $CRAV_N$ and a current time value $CTV_N$ are associated with network element N.

Additionally, for each network element N, an operational state value $OSV_N$ is associated with network element N. A particular network element's operational state value indicates whether the particular network element is in an enabled or disabled state.

At a later time, indicated by a new time value $NTV_N$, a new real availability value $NRAV_N$ for network element N is determined based on the current availability value $CRAV_N$, the current time value $CTV_N$, the new time value $NTV_N$, and the operational state value $OSV_N$. The new real availability value $NRAV_N$ is stored. Thus, each separate network element N may be associated with a separate real availability value that accurately reflects the availability of network element N specifically, regardless of any availability approximated for network element N's type.

According to one embodiment, whenever a new real availability value $NRAV_N$ is determined, the current availability value $CRAV_N$ is set equal to the new real availability value $NRAV_N$, and the current time value $CTV_N$ is set equal to the new time value $NTV_N$. The operational state value $OSV_N$ is updated in response to network element N changing from an enabled state to a disabled state, or vice-versa. Thus, the foregoing steps may be repeated in a recursive manner at any time to determine and store, instantaneously, a current real availability value that accurately indicates the availability of network element N at that time.

In other aspects, the invention encompasses a computer apparatus and a computer-readable medium configured to carry out the foregoing steps.

7.2 Structural and Functional Overview

Figure 5:
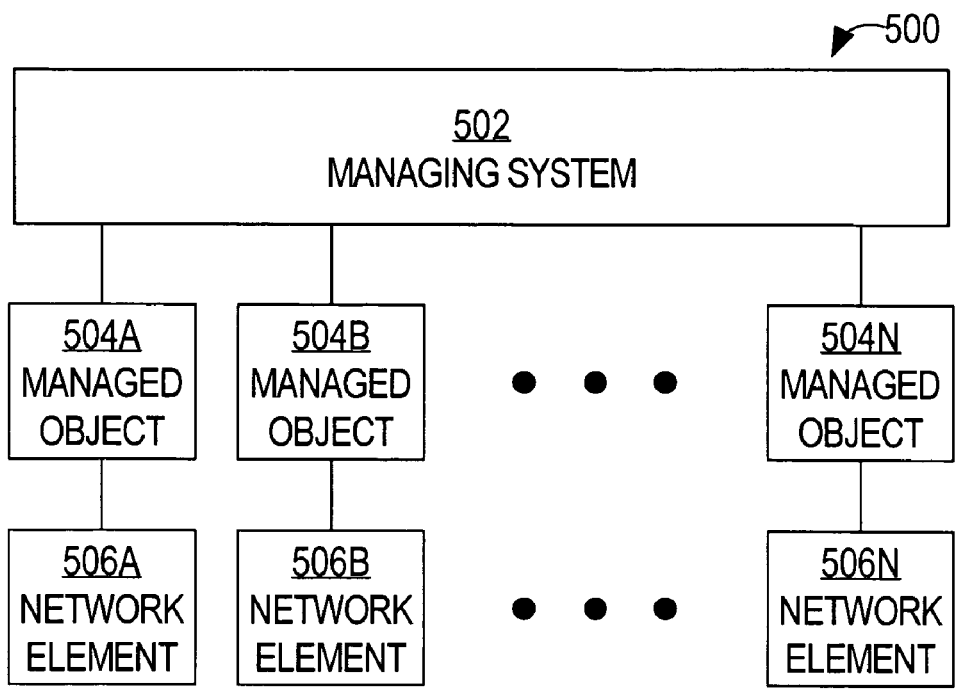
FIG. 5 is a block diagram that illustrates an overview of a system in which network elements are represented by managed objects.

FIG. 5 is a block diagram that illustrates an overview of a system in which network elements are abstracted by managed objects. System 500 comprises a managing system 502, managed objects 504A-N, and network elements 506A-N. Through managed objects 504A-N, managing system 502 sends commands to, and receives responses from, network elements 506A-506N. For each of managed objects 504A-N, there is a separate corresponding one of network elements 506A-N. A managed object may correspond to a service rather than a network element, but for sake of simplicity, system 500 shows only managed objects that correspond to network elements.

Each of managed objects 504A-N abstractly represents the managed object's corresponding network element. Each such managed object comprises attributes that represent aspects of the corresponding network element. For example, managed object 504A may comprise an "operationalState" attribute that indicates the operational state of network element 506A—whether network element 506A is in an enabled or disabled state. When the operational state of network element 506A changes, network element 506A updates the "operationalState" attribute of managed object 504A. Managing system 502 can read the "operationalState" attribute of managed object 504A in order to determine the operational state of network element 506A.

Managed objects 504A-N are not objects in the physical sense. Instead, managed objects comprise data that may be stored, for example, in a management repository. One example of a management repository is a Management Information Base (MIB). Managed objects 504A-N may be implemented in an object-oriented programming environment Each of network elements 506A-506N may comprise one or more programmatic agents that receive commands and send events. For example, an agent may be a Simple Network Management Protocol (SNMP) agent that communicates with an SNMP management station included in managing system 502. For more information on the SNMP MIB, reference may be made to the Internet Engineering Task Force (IETF) Request For Comments (RFC) 1213. Other examples of agents include Syslog agents and Transaction Language 1 (TL1) agents.

Network elements 506A-N may be any devices that communicate data in a computer network. For example, network elements 506A-N may be routers. Depending on the configuration of the computer network in which they are located, various ones of network elements 506A-N may be able to communicate with each other.

Figure 6:
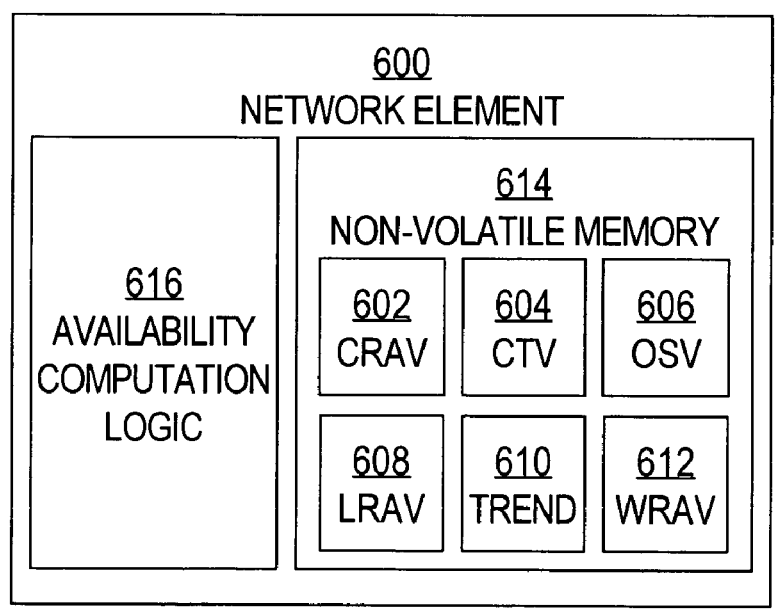
FIG. 6 is a block diagram that illustrates an overview of a network element.

FIG. 6 is a block diagram that illustrates an overview of a network element. Network element 600 is representative of each of network elements 506A-N. Network element 600 comprises a non-volatile memory 614 that stores information. Because memory 614 is non-volatile, information stored in the non-volatile memory is not lost even if network element 600 loses power. Network element 600 further comprises availability computation logic 616 for determining, according to techniques described herein, the values stored in non-volatile memory 614.

Within non-volatile memory 614, network element 600 stores a current real availability value (CRAV) 602, a current time value (CTV) 604, an operational state value (OSV) 606, a lowest recorded real availability value (LRAV) 608, a trend indicator 610, and a weighted real availability value (WRAV) 612. These values pertain only to the particular network element that stores the values. Thus, each of network elements 106A-N stores its own separate set of values.

CRAV 602 indicates, as of the most recent update of CRAV 602, the fraction of time that network element 600 has been in an enabled state since network element 600 was initialized. Initially, CRAV 602 is set equal to "1," indicating that network element 600 has never been in a disabled state since the network element was initialized. Enabled and disabled states are discussed in greater detail below with reference to FIG. 7.

CTV 604 indicates the amount of time that has passed between the initialization of network element 600 and the moment at which CRAV 602 was most recently updated. Thus, whenever CRAV 602 is updated, CTV 604 is updated accordingly. Initially, CTV 604 is set equal to "0," indicating that no time has passed between the initialization of network element 600 and the moment at which CRAV 602 was last updated. To determine CTV 604, for example, a timestamp may be stored when network element 600 is initialized. Then, when CRAV 602 is updated, CTV 604 may be determined by calculating the difference between the stored timestamp and the current time.

OSV 606 indicates whether network element 600 is in an enabled state or a disabled state. If network element 600 is in an enabled state, then OSV 606 equals "1," or another unique flag value. Alternatively, if network element 600 is in a disabled state, then OSV 606 equals "0," or another unique flag value.

LRAV 608 indicates the lowest CRAV that has been measured since network element 600 was initialized. Whenever CRAV 602 is updated, the CRAV is compared to LRAV 608. If CRAV 602 is lower than LRAV 608, then the LRAV is set equal to the CRAV.

Trend indicator 610 indicates whether the availability of network element 600 was ascendant, descendant, or stable (neither ascendant nor descendant) between the times of the two most recent updates of CRAV 602. Whenever CRAV 602 is updated, trend indicator 610 is updated as well.

WRAV 612 is an indicator similar to CRAV 602, except that the WRAV is determined in a manner that gives more weight, or magnitude, to more recently determined values. In contrast, the CRAV is determined in a manner that does not weight values based on the relative recentness of those values. Techniques for determining CTV 602 and WRAV 612 are discussed in greater detail below with reference to FIG. 9.

Each of the values described above, when updated in the non-volatile memory of the network element to which those values pertain, may also be updated in the managed object that corresponds to the network element. Thus, managing system 502 may read current real availability values for each of network elements 506A-N by referring to the corresponding ones of managed objects 504A-N. Alternatively, managing system 502 may obtain current real availability values by sending a request in a management protocol, such as SNMP, or through a programmatic interface.

Therefore, each separate network element is associated with a separate real availability value that may be updated instantly and obtained and used by management applications. As a result, applications such as availability-based routing, which require current, accurate, network element-specific availability metrics, are enabled.

In one embodiment, the current state of network element 600 may be, at any given moment, one of several defined states. When the current state of network element 600 is a particular defined state, the network element may be the to be "in" the particular defined state. Events detected by network element 600 may cause the network element to transition from one such defined state to another.

Events may be classified broadly into two major categories: "operational" events and "management" events. Management events occur in response to commands sent from outside network element 600. For example, a management event would occur in response to managing system 602 sending, to network element 600, a command instructing the network element to shut down. In contrast, operational events do not occur in response to commands sent from outside network element 600. For example, an operational event would occur in response to one or more components of network element 600 experiencing a failure.

To maintain accuracy, a network element's availability should be influenced by state changes resulting from operational events, but a network element's availability should not be affected by state changes resulting from management events. For example, if a network element becomes non-operational as a result of being shut down purposefully, then the time period during which the network element is non-operational should be ignored when determining the network element's availability, because that time period does not truly reflect upon the network element's inherent availability tendencies. If not for being shut down purposefully, the network element might have remained operational during the entire period that the network element was not operational.

Figure 7:
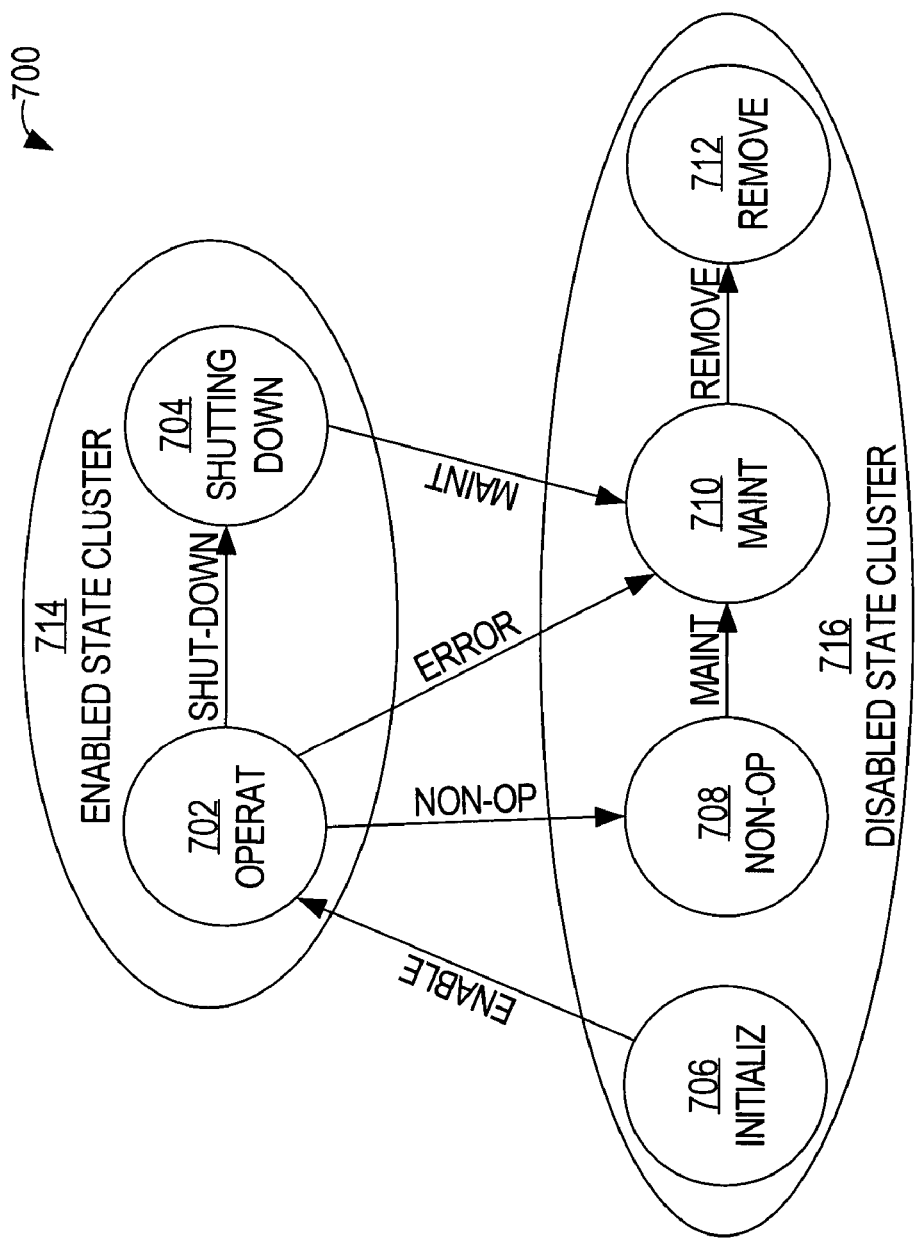
FIG. 7 is a state diagram that illustrates enabled and disabled state clusters.

FIG. 7 is a state diagram that illustrates enabled and disabled state clusters. State machine 700 comprises defined states 702-712. Among these defined states are an "operat" state 702, a "shutting down" state 704, an "initializ" state 706, a "non-op" state 708, a "maint" state 710, and a "remove" state 712. Defined states 702-712 are distributed among an enabled state cluster 714 and a disabled state cluster 716.

Enabled state cluster 714 comprises "operat" state 702 and "shutting down" state 704, referred to collectively as "enabled" states. The enabled states are included in enabled state cluster 714 because, when network element 600 is in either of the enabled states, the network element should be considered to be "available."

Disabled state cluster 716 comprises "initializ" state 706, "non-op" state 708, "maint" state 710, and "remove" state 712, referred to collectively as "disabled" states. The disabled states are included in enabled state cluster 714 because, when network element 600 is in any of the disabled states, the network element should be considered to be "unavailable."

As shown in FIG. 7, various events can cause network element 600 to transition from one defined state to another. If an "enable" event is detected while network element 600 is in "initializ" state 706, then the network element transitions from "initializ" state 706 to "operat" state 702. If a "non-op" event is detected while network element 600 is in "operat" state 702, then the network element transitions from "operat" state 702 to "non-op" state 708. If an "error" event is detected while network element 600 is in "operat" state 706, then the network element transitions from "operat" state 702 to "maint" state 710. If a "shut-down" event is detected while network element 600 is in "operat" state 702, then the network element transitions from "operat" state 702 to "shutting down" state 704. If a "remove" event is detected while network element 600 is in "maint" state 710, then the network element transitions from "maint" state 710 to "remove" state 712. If a "maint" event is detected while network element 600 is in "non-op" state 706 or "shutting down" state 704, then the network element transitions from the network element's current state to "maint" state 710.

Defined states 702-712 are distributed among state clusters 714 and 716 in such a way that operational events may cause a transition between defined states in different state clusters, but management events such as "shut-down" only cause transitions between states in the same state cluster. Therefore, network element 600 does not transition between enabled and disabled states in response to management events.

As is described in greater detail below, real availability values are determined based at least in part on OSV 606, which indicates whether a network element is in an enabled state or a disabled state. Therefore, by preventing management events from causing transitions between enabled and disabled states, real availability values are not tainted by events that do not truly reflect upon a network element's innate availability tendencies.

In one embodiment, real availability values are determined either in response to events that cause a transition between enabled and disabled states, or in response to commands to determine the real availability values. Thus, current real availability values may be provided on demand.

Figure 8:
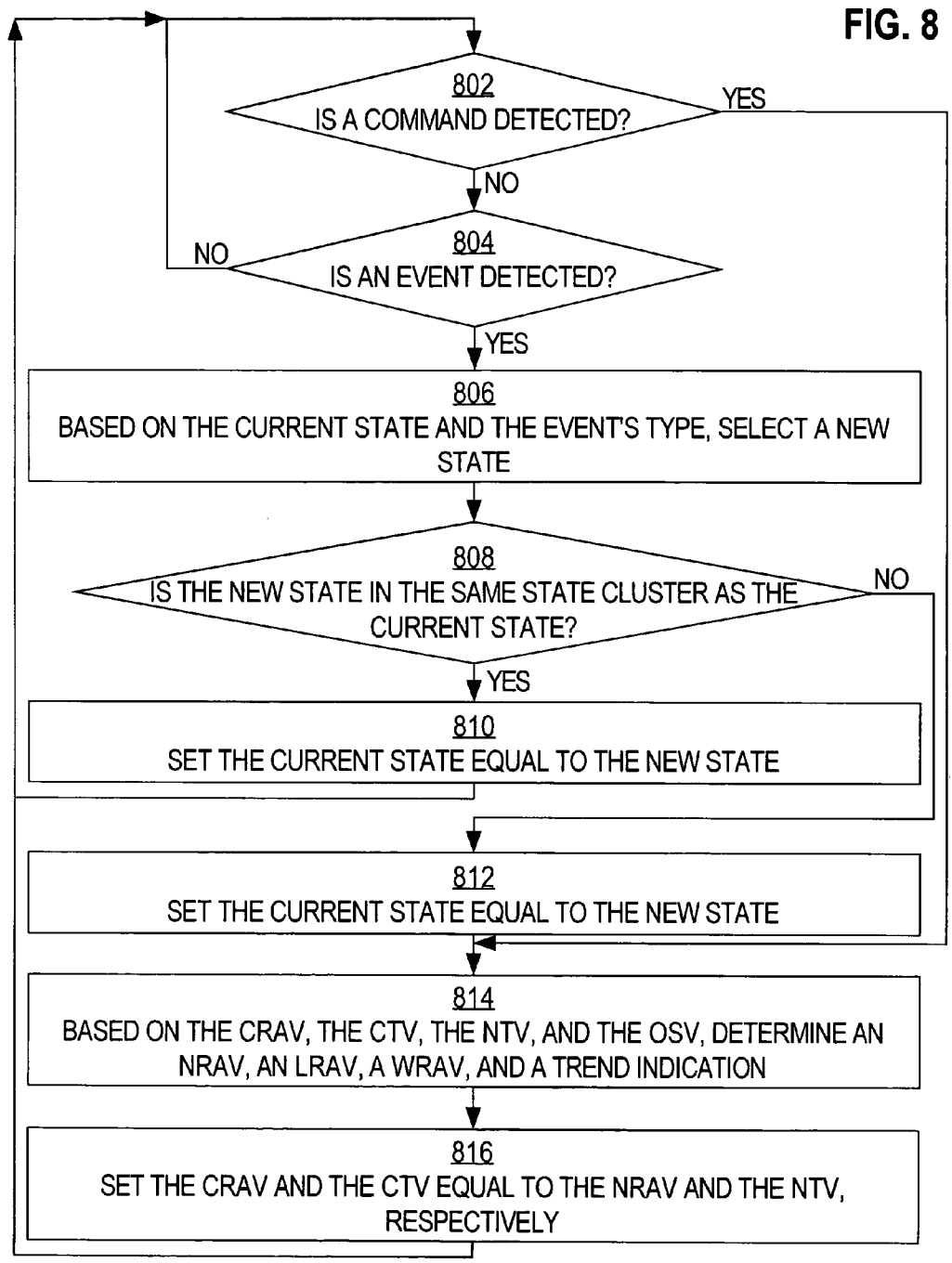
FIG. 8 is a flow diagram that illustrates a high level overview of one embodiment of a method for measuring the availability of a network element or service.

FIG. 8 is a flow diagram that illustrates a high level overview of one embodiment of a method for measuring the availability of a network element or service. In block 802, it is determined whether a command is detected. For example, network element 506A may determine whether managing system 502 has sent a command that instructs the network element to update the network element's real availability values. If a command is detected, then control passes to block 814. Otherwise, control passes to block 804.

In block 804, it is determined whether an event is detected. For example, network element 506A may determine whether an agent has sent an event. If an event is detected, then control passes to block 806. Otherwise, control passes back to block 802.

In block 806, based on a current state and the detected event's type, a new state is selected. For example, network element 506A may select the new state according to the states and event-triggered transitions shown in FIG. 7. For a more specific example, if a network element's current state is "operat" state 702 and the event is a "non-op" type of event, then "non-op" state 708 may be selected as the new state. Control then passes to block 808.

In block 808, it is determined whether the new state is in the same state cluster as the current state. For example, if the current state is "operat" state 702 in enabled state cluster 714, and the new state is "non-op" state 708 in disabled state cluster 716, then network element 506A may determine that the current state and the new state are in different state clusters. If the new state and the current state are in the same state cluster, then control passes to block 810. Otherwise, control passes to block 812.

In block 810, the current state is set equal to the new state. For example, if the new state is "shutting down" state 704, then the current state is set to "shutting down" state 704. In this example, because the new state and the current state were in the same state cluster, there was no transition between an enabled state and a disabled state. Therefore, the real availability values do not need to be updated in response to the determination, and control passes back to block 802.

Similarly, in block 812, the current state is set equal to the new state. However, because the new state and the current state were not in the same state cluster in this case, there was a transition between an enabled and a disabled state. Therefore, the real availability values are to be updated. Control passes to block 814.

In block 814, a new real availability value (NRAV), an LRAV, a WRAV, and a trend indicator are determined based at least in part on the CRAV, the CTV, a new time value (NTV), and the OSV. The NTV indicates the amount of time that has passed between the initialization of the network element and the moment at which the NRAV is determined. One embodiment of a process for determining the NRAV, LRAV, WRAV, and trend indicator is described below with reference to FIG. 9.

In block 816, the CRAV and the CTV are set equal to the NRAV and the NTV, respectively. Because the new real availability values can overwrite the former real availability values after the new real availability values are determined, storage requirements are reduced. Because the new real availability values replace the former real availability values, the method described above can be performed in a recursive manner to obtain fresh and accurate availability values on demand and in real time.

7.3 Implementation Example

A detailed example implementation of the foregoing general approaches is now described.

Figure 9:
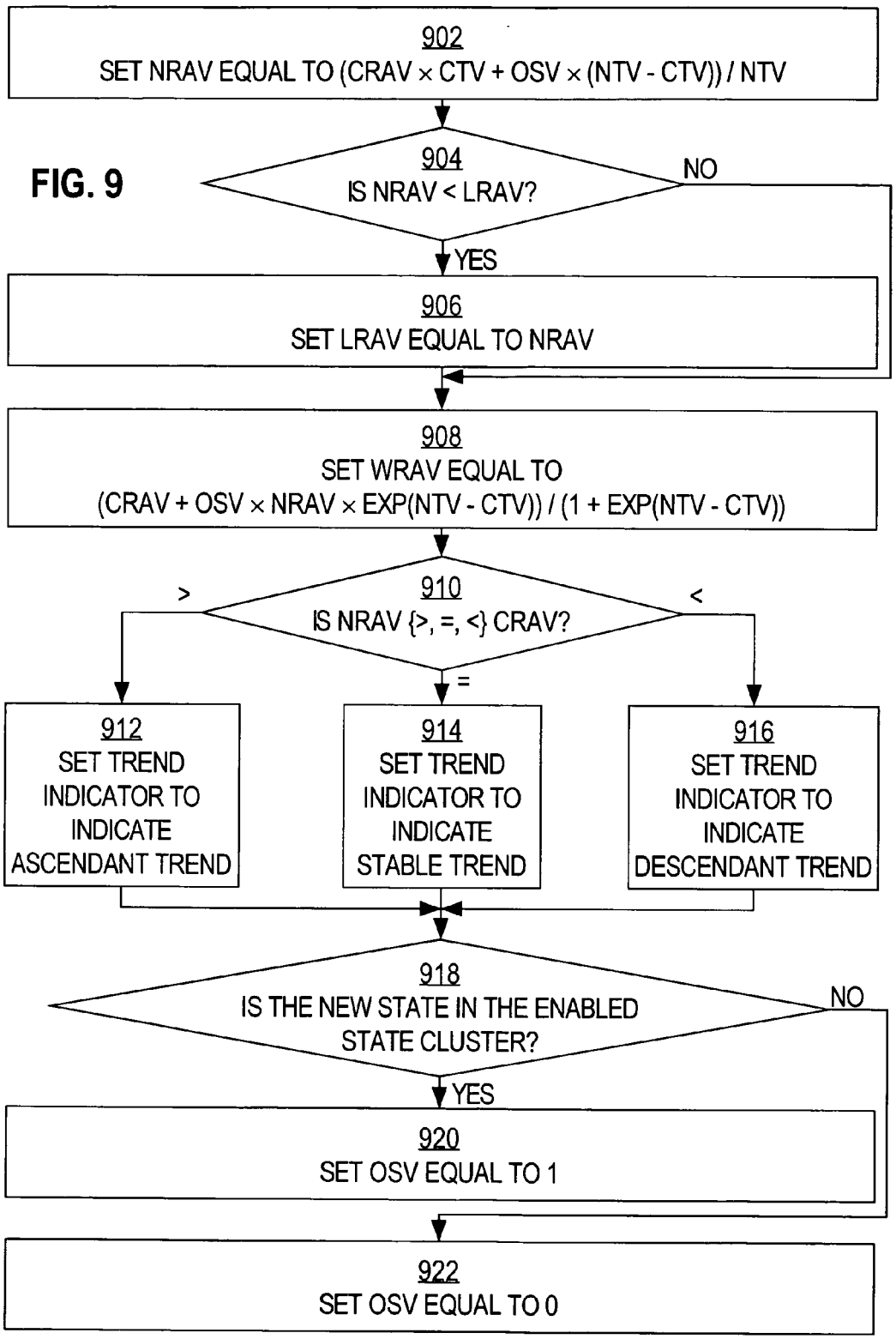
FIG. 9 is a flow diagram that illustrates the determination of the NRAV, the LRAV, the WRAV, and the trend indicator based on the CRAV, the CTV, the OSV, and the NTV.

FIG. 9 is a flow diagram that illustrates the determination of the NRAV, the LRAV, the WRAV, and the trend indicator based on the CRAV, the CTV, the OSV, and the NTV. In block 902, the NRAV is set equal to:

$$(CRAV \cdot CTV + OSV \cdot (NTV - CTV))/NTV.$$

For example, if the CRAV is "1" and the CTV is "5," then at 5 seconds after the network element's initialization, the network element's availability was 100%. If the NTV is "6" and the OSV is "0," then at 6 seconds after the network element's initialization, the network element is in a disabled state. Under these circumstances, calculating the NRAV according to the equation above yields an NRAV of 83%.

In block 904, it is determined whether the NRAV is less than the LRAV. If the NRAV is less than the LRAV, then control passes to block 906. Otherwise, control passes to block 908.

In block 906, the LRAV is set equal to the NRAV. Thus, the LRAV indicates the lowest recorded real availability value for the network element. Control passes to block 908.

In block 908, the WRAV is set equal to:

$$(CRAV + OSV \cdot NRAV \cdot EXP(NTV-CTV))/(1+EXP(NTV-CTV))$$

where EXP(NTV–CTV) is an exponential function of the difference between the NTV and the CTV. The evaluation of the exponential function yields a "weight value." By multiplying the NRAV by the weight value in the above equation, the NRAV is given greater weight than the CRAV, which was calculated at an earlier time.

In one embodiment, the exponential function returns a value that is also, or alternatively, based on other factors. For example, in one embodiment, the exponential function returns a value that is based on the type of event detected in block 404. In one embodiment, the exponential function returns a value that is based on a type of the network element or service for which the WRAV is to be determined.

Different types of network elements and services may be associated with different "confidence" indicators that indicate how accurately those types can measure availability. Thus, the exponential function may return a result that is based on the confidence indicator that is associated with the type of network element or service for which the WRAV is to be determined. As a result, a WRAV for a network element of a type associated with a high confidence indicator may be higher than a WRAV for a network element of type associated with a low confidence indicator.

In block 910, it is determined whether the NRAV is greater than, less than, or equal to the CRAV. If the NRAV is greater than the CRAV, then control passes to block 912. If the NRAV is equal to the CRAV, then control passes to block 914. If the NRAV is less than the CRAV, then control passes to block 916.

In block 912, due to the NRAV being greater than the CRAV, the trend indicator is set to indicate an ascendant trend. Control then passes to block 918.

In block 914, due to the NRAV being equal to the CRAV, the trend indicator is set to indicate a stable trend. Control then passes to block 918.

In block 916, due to the NRAV being less than the CRAV, the trend indicator is set to indicate a descendant trend. Control then passes to block 918.

In block 918, it is determined whether the new state, which was selected in block 806, is in the enabled state cluster (e.g., enabled state cluster 714). If the new state is in the enabled state cluster, then control passes to block 920. If the new state is in the disabled state cluster (e.g., disabled state cluster 716), then control passes to block 922.

In block 920, due to the new state being in the enabled state cluster, the OSV is set equal to "1," or another flag value. Alternatively, in block 922, due to the new state being in the disabled state cluster, the OSV is set equal to "0," or another flag value. Thus, the next time that the NRAV is determined, the OSV will correctly indicate whether the network element was, during the time interval prior to the determination, in an enabled or a disabled state.

The technique described above may be performed at multiple times in a recursive manner. As indicated in block 416 above, the CRAV and the CTV are set equal to the NRAV and the NTV, respectively. Therefore, each time that new real availability values are determined, the new real availability values are determined based on previously determined real availability values.

For example, in a first iteration of the above technique, when the NTV is "6," the NRAV may be determined to be "0.83." The CRAV is then set to "0.83," and the CTV is set to "6." Later, in a second iteration of the above technique, when the NTV is "7," the NRAV may be determined to be "0.85." The CRAV is then set to "0.85," and the CTV is set to "7." Still later, in a third iteration of the above technique, when the NTV is "10," the NRAV may be determined to be "0.6." The CRAV is then set to "0.6" and the CTV is set to "10." At each iteration, the OSV may be updated to indicate a transition between enabled and disabled states if such a transition occurred. Thus, a management system can ascertain, on demand, any network element's or service's current real availability.

Dynamic Availability
8.1 Overview

An approach is provided for characterizing the dynamic availability behavior of network elements using metrics that indicate patterns of availability of a network element over time. The metrics provide an indication of stability and instability of a network element and include one stability metric and three instability metrics. The stability metric is a stability order that indicates how long an operational state of a network element holds with respect to a prior operational state. The instability metrics include an instability order, a repeatability order and a multiplicity order. The instability order indicates how quickly a network element changes operational states. The repeatability order indicates short-term instability of a network element within a vicinity of a change in operational state. The multiplicity order indicates long-term instability of a network element.

Each of these metrics is described in more detail hereinafter and may be used alone, or in various combinations, depending upon the requirements of a particular implementation. For purposes of explanation, embodiments of the invention are described herein in the context of characterizing the dynamic availability behavior of network elements with respect to two operational states: enabled and disabled. The approach, however, is applicable to any type and number of operational states.

8.2 Stability Order

The stability order metric indicates how long an operational state holds with respect to a prior operational state. Stated another way, the stability order metric indicates how stable a particular operational state is with respect to a prior operational state. The stability order is specific to each operational state of each network element and may change over time. Thus, a network element may have various stability orders over time for each operational state and a new stability order may be determined after each operational state change.

Figure 10:
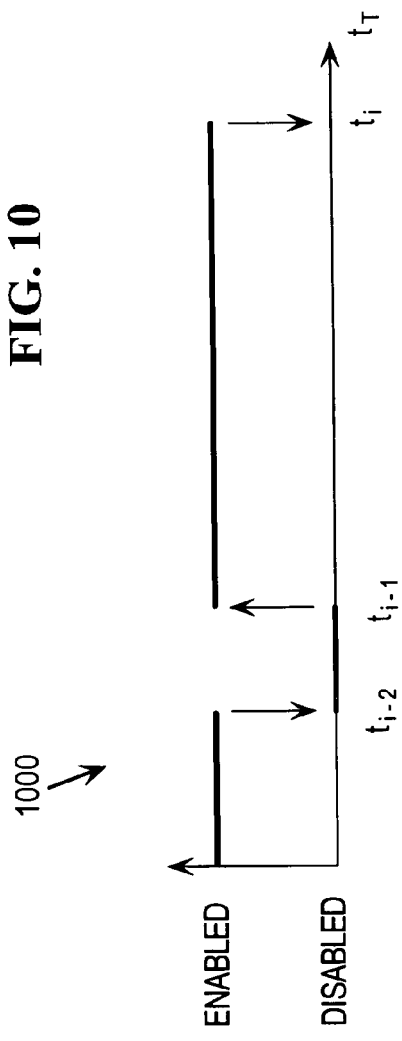
FIG. 10 is a block diagram that depicts the state of a network element over time.

FIG. 10 depicts the operational state of a network element over time $t_T$. More specifically, FIG. 10 depicts that the network element is operating in an enabled operational state prior to timestamp $t_{i-2}$ and at timestamp $t_{i-2}$ transitions to a disabled operational state. At timestamp $t_{i-1}$ the network element transitions from the disabled operational state to the enabled operational state and remains in the enabled operational state from timestamp $t_{i-1}$ to at least timestamp $t_i$.

According to one embodiment of the invention, the stability order of the network element on $\delta_{i-1,i}=t_i-t_{i-1}$ is defined by k (integer value)=$[(t_i/t_{i-1})-1]$. The stability order reflects state change events and depends only upon the $t_i$ timestamps that indicate when operational state changes occur. For example, suppose that timestamp $t_{i-1}$ is at time 1 and timestamp $t_i$ is at time 10. In this example, the stability order of the enabled state of the network element for the time period $t_{i-1}$ to $t_i$ is $(10/1)-1=9$. As another example, suppose that timestamp $t_{i-1}$ is at time 10 and timestamp $t_i$ is at time 10000. In this example, the stability order of the enabled state of the network element for the time period $t_{i-1}$ to $t_i$ is $(10000/10)-1=999$. The relatively higher stability order of the second example indicates a relatively higher stability compared to the first example, i.e., that the enabled state has held for a relatively longer period of time since the preceding state change. The notation k and k' are used herein to refer to the stability order of the enabled operation state and the disabled operational state, respectively.

Over time, each operational state of a network element may have numerous stability orders that may vary significantly in magnitude. This is attributable to the fact that the time between operational state changes may vary over time. For management purposes, it is sometimes valuable to know the range of stability orders for a particular operational state of a particular network element over time. According to one embodiment of the invention, minimum and maximum stability orders, referred to herein as $k_{min}$ and $k_{max}$ for the enabled operational state, and $k'_{min}$ and $k'_{max}$ for the enabled operational state, are determined for each operational state of a network element for each $t_i$.

8.3 Instability Order

The instability order metric indicates how quickly a network element changes operational states based upon the magnitude of the interval separating consecutive rapid event occurrences. The instability order reflects state change events and like the stability order, depends only upon the $t_i$ timestamps that indicate when operational state changes occur. The instability order is defined as having a magnitude of p, if $\delta_{i-1,i}=10^{-p} \times t_{i-1}$.

Some network elements are inherently stable and only rarely transition between operational states. In these situations, the instability order must be determined over very long periods of time. According to one embodiment of the invention, a logarithmic function is used for determining the instability order over long periods of time as follows: $p=[-\log(t_i-t_{i-1})/t_{i-1}]$, where the instability order is an integer value. As an example, suppose that timestamp $t_{i-1}$ occurs at a time 1 and timestamp $t_i$ occurs at a time 10. In this example, the instability order of the enabled state of the network element for the time period $t_{i-1}$ to $t_i$ is $-\log(10-1)/1=-0.9542$, or $-1$. As another example, suppose that the timestamp $t_{i-1}$ occurs at time 1 and the timestamp $t_i$ occurs at time 1000. In this example, the instability order of the enabled state of the network element for the time period $t_{i-1}$ to $t_i$ is $-\log(1000-1)/1=-2.999$, or $-3$. As yet another example, suppose that the timestamp $t_{i-1}$ occurs at a time 1 and the timestamp $t_i$ occurs at a time 10000. In this example, the instability order of the enabled state of the network element for the time period $t_{i-1}$ to $t_i$ is $-\log(10000-1)/1=-3.999$, or $-4$. Thus, a larger negative instability order value indicates less instability (greater stability), while an instability order closer to 0 indicates greater instability (less stability). The use of a log function is not required, although without it, instability orders may become large when calculated for long periods of time.

A network element may have different instability orders $\{p_1, p_2, \ldots p_s\}$ over a time period $t_T$ for each operational state. In some situations, it may be desirable to calculate a complete set of instability orders for certain operational states. In other situations, where there exists a large number of instability orders for an operational state, it may be desirable to reduce the amount of instability data that is maintained. According to one embodiment of the invention, the instability order of an operational state is described by a minimum instability order and a maximum instability order, $[p_{min}, p_{max}]$, where $p_{min}=\min \{p_i | 1<=i<=s\}$ and $p_{max}=\max \{p_i | 1<=i<=s\}$. Other techniques may be used to reduce the amount of instability order data maintained for a particular operational state, such as maintaining instability order data for particular time periods of interest.

Across any given time period, short intervals between operational state changes may occur many times, either with the same or different instability orders. Therefore, according to one embodiment of the invention, an instability order is further characterized by its repeatability, over the short term, or its multiplicity, over the long term.

8.4. Repeatability Order

Figure 11:
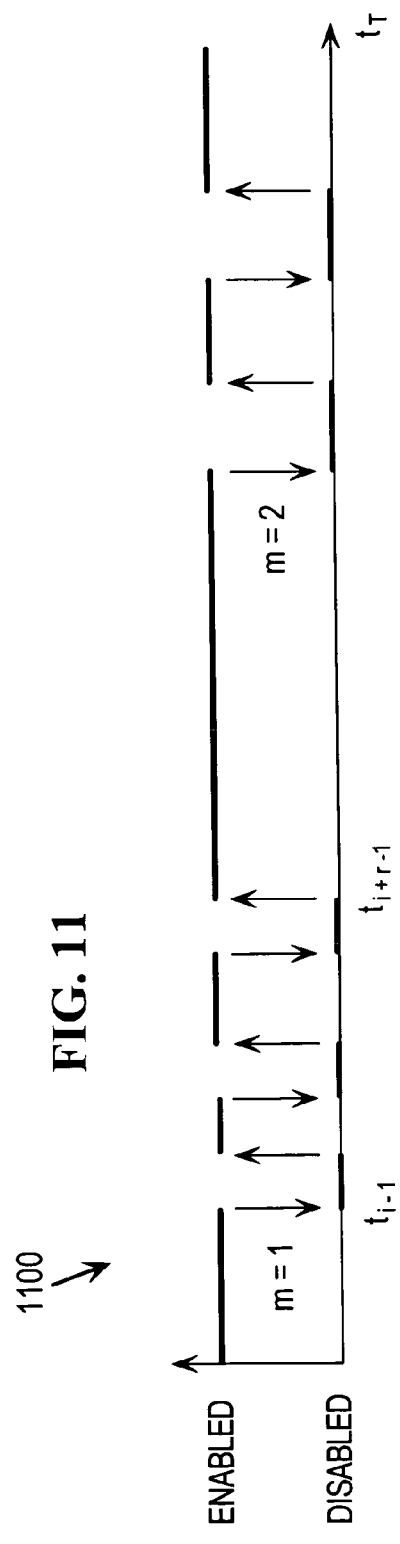
FIG. 11 is a block diagram that depicts the state of a network element over time and the availability behavior of the network element characterized by an instability order, a repeatability order and a multiplicity order.

If an instability order occurs r times consecutively, then the instability of order p has a repeatability of order r. FIG. 11 visually depicts operational state changes of a network device, having an instability order p and a repeatability order r. Thus, if $\delta_{i+j-2, i+j-1} \approx 10^{-P} \times t_{i+j-2}$, for $j=1, 2, \ldots r$, then the instability behavior is characterized as having an instability of order p and a repeatability of order r.

Each instability order $p_i$ may have any number of different repeatability orders $\{r_{i0}, r_{i1} \ldots r_{iw}\}$ over time. For example, during one period of time, an operational state of a particular network element may have a particular instability order with a repeatability order of ten, indicating that the particular instability order occurred ten times consecutively. This may occur, for example, if an external stimulus is repeatedly causing the particular network element to enter a disabled operational state. Administrative personnel discover and rectify the external stimulus, thereby curing that particular instability. Sometime later, a different external stimulus causes the particular network element to enter the disabled state on an intermittent basis. This time, however, the particular instability order does not occur ten times consecutively. Thus, the particular instability order has a different repeatability order.

According to one embodiment of the invention, each instability order $p_i$ is characterized by $r_{i/min}=\min \{r_{ij} | 0<=j<=w, 1<=i<=s\}$ and by $r_{i/max}=\max \{r_{ij} | 0<=j<=w, 1<=i<=s\}$. This is semantically equivalent to the minimum and maximum number of consecutive change intervals of the same range p, within an approximation given by the error of the function $f(x)=[x]$. Repeatability orders may be expressed as integers.

8.5 Multiplicity Order

The instability order and repeatability order characterize the availability behavior of a network element in the vicinity of the time $t_{i-1}$ by considering j consecutive time intervals $\delta_{i+j-2, i+j-1}$ that satisfy the instability order $p_i$. The multiplicity order indicates the number of times within a time period $t_T$ that this behavior occurs. More specifically, a multiplicity order of m indicates the number of times that a network element has experienced an instability of order $p_i$ during a specified time period, with or without a repeatability order. As depicted in FIG. 11, presuming that the instability order p and the repeatability order r are the same, the multiplicity order is 2. For the $p_1$ and $p_2$ instability orders, the tuples $(p_1, 5, 1)$ and $(p_2, 3, 1)$ describe the instability of the operational state within the time period $t_T$. Further, at any pair $(P_i, r_{ij})$, the multiplicity order $m_{(pi, rij, t)}$ indicates the number of times that the instability of order $p_i$ and repeatability $r_{ij}$ have occurred within the time period $t_T$. The multiplicity order may be represented by an integer number.

8.6 Dynamic Availability Behavior Function

According to one embodiment of the invention, the aforementioned stability and instability metrics are implemented using a dynamic availability behavior function. As described hereinafter in more detail, this function is implementation independent and therefore may be implemented in a wide variety of locations using any type of computing architecture and communications protocols. For example, the function may be invoked by managed objects, that abstractly represent corresponding network elements, or by management applications. An example dynamic availability behavior function is $D_{id}(t_i)$, which is represented by the values $\{t_i, ([k_{min}, k_{max}], [k'_{min} \text{ and } k'_{max}]), (p_i), (r_{ij}), (m_{pi, rij, T})\}$ at time $t_i$, as described herein. The k and p orders are computed using formulas and the r and m orders are counters related to p occurrences. The k and p orders become relevant over some thresholds $k_0$ and $p_0$, which may be specified for each network element type. In one example implementation of this function, the input values include an identifier for the subject network element, $D_{id}$, a state change event identifier and timestamp, $k_0$ and $p_0$ threshold values and previous $D_{id}(t_{i-1})$. The output $D_{id}(t_i)$ values are computed with respect to the prior $D_{id}(t_{i-1})$ values and the $k_0$ and $p_0$ threshold values.

Figure 12:
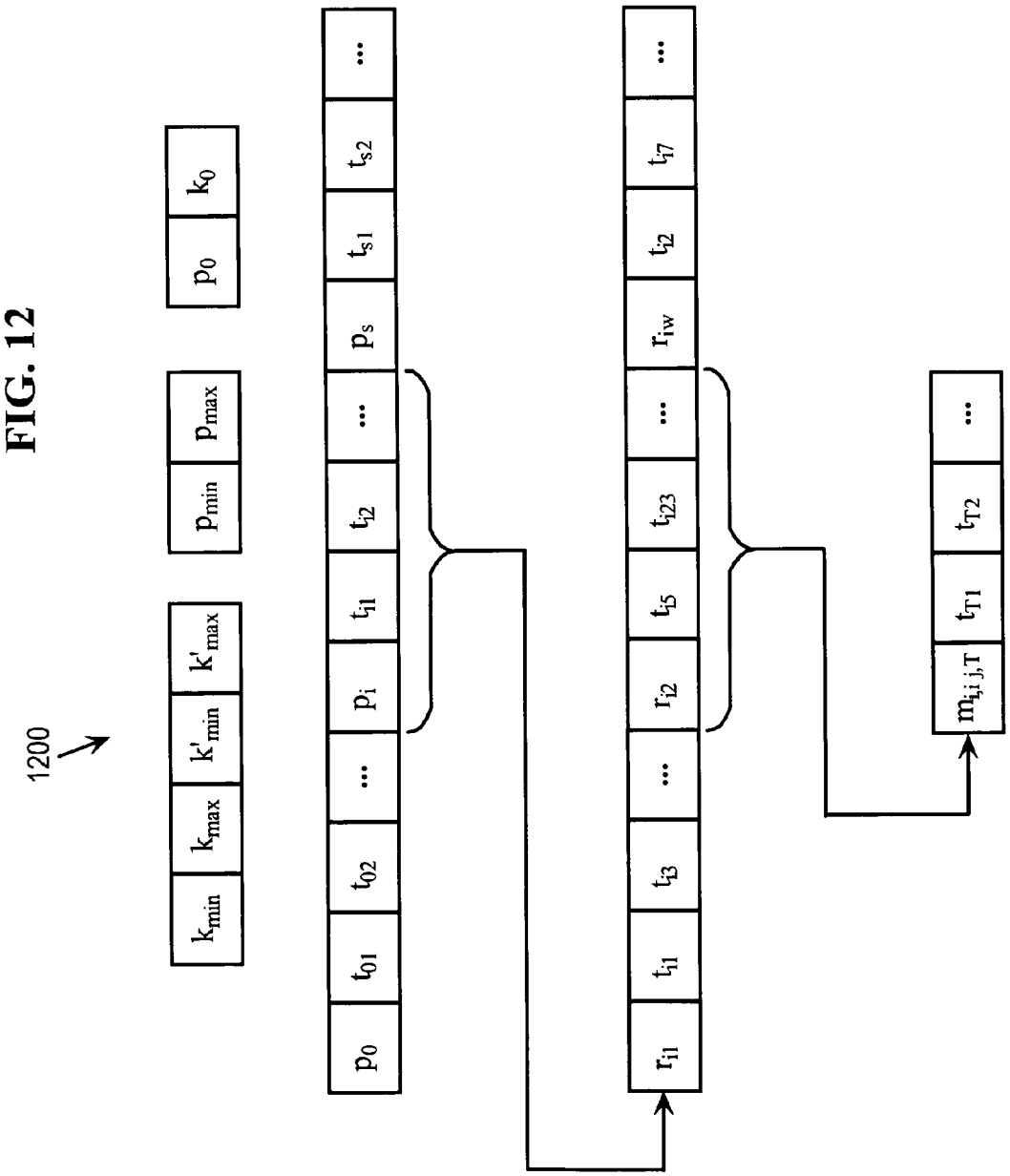
FIG. 12 is a block diagram that depicts an example data parameter representation 300 for stability and instability metric data.

FIG. 12 is a block diagram that depicts an example data parameter representation 300 that may be used to implement the approach described herein. For example, an algorithm implementing the function may use data parameter representation 300, or a variation thereof. The stability order extreme values $k_{min}, k_{max}, k'_{min}$ and $k'_{max}$ and the instability extreme values $p_{min}, p_{max}$ may be specified, for example, by a management application. The $k_0$ and $p_0$ thresholds are typically specific to each network element. Each computed instability order greater than or equal to p0 is attached to the list of instability orders. If the instability order has been previously computed, then only the new timestamp is attached to the instability order record field. Each distinct instability order value has its own timestamp list. Each instability order may have distinct repeatability orders. Data parameter representation 300 depicts an extended description for the order $p_i$ by all $r_{ij}$ ($j=1, 2, 3 \ldots$) repeatability orders. There would therefore be s number of repeatability order lists for s distinct instability orders (p). Each instability order/repeatability order pair $(p_i, r_{ij})$ can appear m times across a time period $t_T$. For management purposes, the multiplicity order m is separately identified and each increment is stamped by $t_{Ti}$. As an alternative, the multiplicity order values may be attached to the $r_{ij}$ description list, as an additional parameter.

The dynamic availability behavior metrics may be computed starting with $t_0$ (start), or at any random timestamp $t_i$. In the situation where the dynamic availability behavior metrics are computed starting with $t_0$, then the initialization includes setting $k_{min}=k_{max}=k'_{min}=k'_{max}=k_0$ and setting $p_{min}=p_{max}=p_0$. Where the dynamic availability behavior metrics are computed at some other timestamp $t_i$, then the initialization includes setting the initial values to $D(ti-1)$.

8.7 Generating and Managing Dynamic Availability Data

The aforementioned metrics may be calculated at a variety of locations within a distributed system, depending upon the requirements of a particular implementation. For example, network elements may be configured to calculate the stability and instability metrics and store the results locally. Network elements may be further configured to periodically delete metric data to reduce the amount of data stored locally. Network elements may also be configured to transmit stability and instability metric data to other network elements or applications, such as a central repository or a management application.

The aforementioned stability and instability metrics may also be generated by management applications or other entities. For example, network elements may be configured to provide timestamp data for operational state changes to a management application. The management application then uses the timestamp data to calculate the stability and instability metrics as described herein. Alternatively, network elements may provide the timestamp data to a repository and the management application then retrieves the timestamp data from the repository and generates the stability and instability metric data. The resulting metric data may be stored locally at the management application or back into the repository. The metric data may then be periodically deleted from the local storage associated with the management application, or from the repository, depending upon the requirements of a particular application.

8.8 Implementation Mechanisms

The approach described herein for characterizing the dynamic availability behavior of network elements using stability and instability metrics may be used alone or in combination with any other availability metrics for network elements. Furthermore, the approach may be used in any number of applications and contexts, depending upon the requirements of a particular application. For example, the approach may be used to rank network elements based upon their individual dynamic availability using the metrics described herein. Network elements may then be selected for particular applications based upon the rankings and the requirements of the applications. For example, some applications, e.g., network service applications, may include long-term or sensitive transactions that require a certain level of stability to provide a particular level or quality of service. Network elements may be selected to support the network service applications based upon their dynamic availability behavior or ranking. Thus, external constraints may dictate the particular network elements that are selected for a particular application. Some network element providers may even choose to charge customers different rates based upon the dynamic availability behavior ranking of the network elements made available to customers.

The dynamic availability behavior of network elements may change over time. For example, external stimuli that were causing a network element to be unstable may no longer exist. Thus, although this network element may have historically had a dynamic availability behavior that made it unsuitable for particular applications, this network element has now become stable. As another example, another network element that was historically characterized as being stable is now subjected to new external stimuli that causes the network element to become unstable. The approach described herein for characterizing the dynamic availability behavior may be periodically applied to network elements to update their corresponding metrics values. This allows a network management application to determine whether network elements are no longer suitable for a particular application and to replace those network elements with other network elements that are suitable. Similarly, a network management application may identify network elements that previously were not suitable for use in certain applications, but that have become suitable.

As previously described herein, the approach is applicable to any type and number of operational states. For example, for a particular network element that has ten operational states, the stability and instability metrics may be used to characterize the dynamic availability behavior of the particular network element with respect to each of its ten operation states, or any subset of the ten operational states.

For purposes of explanation, embodiments of the invention have been described herein in the context of calculating the stability and instability metrics based upon when operational state changes occur, without regard to the particular event that caused the changes in operational state. The approach, however, may be selectively applied to changes in operational states based upon particular events or combinations of events. This allows characterizing the dynamic availability behavior of network elements with respect to certain events, or combinations of events. This may be particularly useful for billing, auditing or failure analysis applications. The approach may also be suspended for specified periods of time, for example, during testing.

Figure 13:
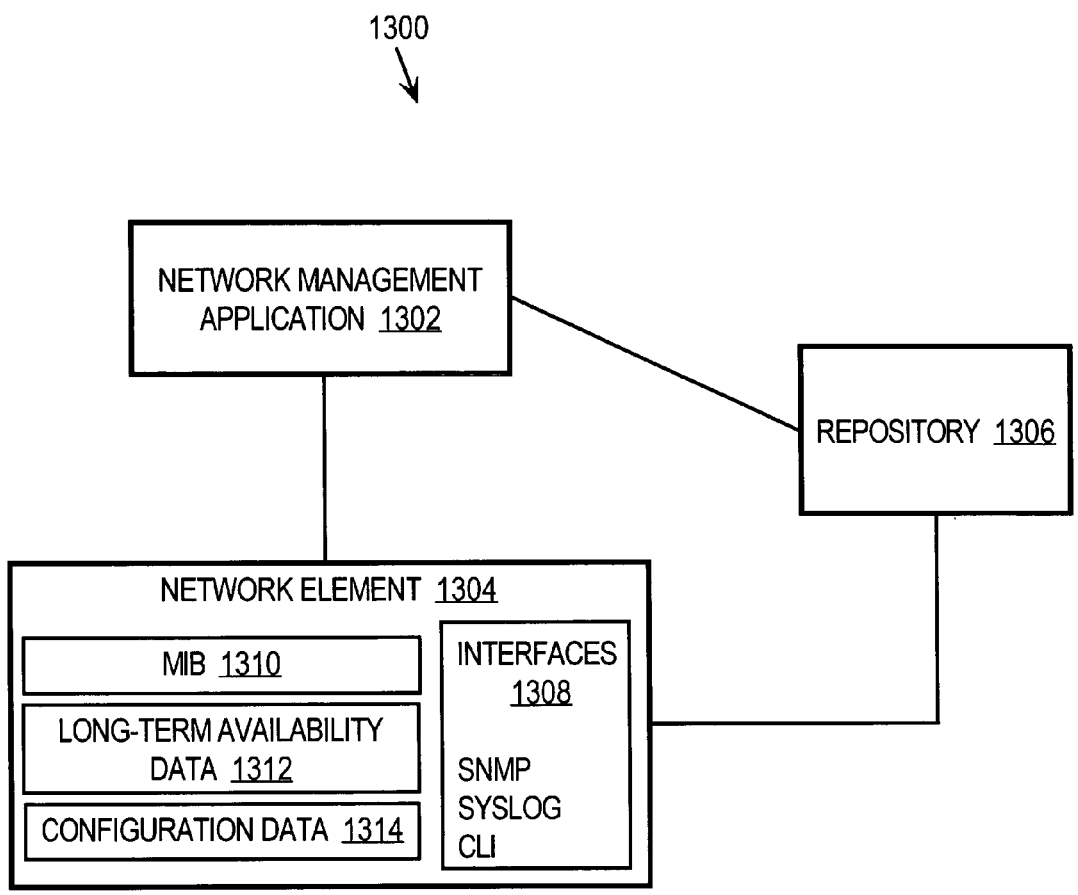
FIG. 13 is a block diagram that depicts a simplified example arrangement upon which embodiments of the invention may be implemented.

FIG. 13 is a block diagram that depicts a simplified example arrangement 1300 upon which embodiments of the invention may be implemented. Arrangement 1300 includes a network management application 1302, a network element 1304 and a repository 1306. Network management application 1302, network element 1304 and repository 1306 may be communicatively coupled via any mechanisms or media. Examples include, without limitation, one or more communications links and networks. Network element 1304 may be any type of network element. Example implementations of network element 1304 include, without limitation, network devices, routers, switches and gateways. The invention is not limited to these examples.

In example arrangement 1300, network element 1304 includes one or more interfaces 1308 that support a variety of communications protocols for communicating with other network elements and applications. For example, interfaces 1308 may include a SYSLOG interface and a Command Line Interface (CLI) and support a variety of communications protocols, such as the Simple Network Management Protocol (SNMP). Network element 1304 also includes a Management Information Base (MIB) 1310 that contains one or more objects that can be managed by network management application 1302. Network element 1304 also includes long-term availability data 1312 that indicates the past availability of network element 1304 over a long period of time.

Network element 1304 further includes configuration data 1314 that may specify several aspects of the approach described herein. For example, configuration data 1314 may specify the operational state changes that are to be recorded by network element 1304. Configuration data 1314 may also specify a set of qualifying events for the operational state changes. For example, configuration data 1314 may specify that network element 1304 is to record a timestamp for changes in operational state made in response to particular events. Configuration data 1314 may further specify a set of actions to be taken in response to operational state changes. For example, configuration data 1314 may specify that timestamp data is to be generated and stored locally on network element 1304 or sent to repository 1306, with or without notification to network management application 1302. Configuration data 1314 may further specify that network element 404 is to calculate stability and instability metrics, as described herein, and store the results locally and/or send the results to repository 1306. Configuration data 1314 may also specify when timestamp and stability and instability metric data is to be deleted from the local storage on network element 1304.

Configuration data 1314 may be initialized when network element 1304 is first put into service and then dynamically updated over time, depending upon the implementation. For example, if network element 1304 is scheduled to be involved in testing, then network management application 1302 may update configuration data 1314 to indicate that no timestamp data should be generated. As another example, network management application 1302 may update configuration data 1314 to specify a new set of events that should trigger the generation of timestamp data. Alternatively, network element 1304 may itself retrieve updated configuration data 1314.

Figure 14:
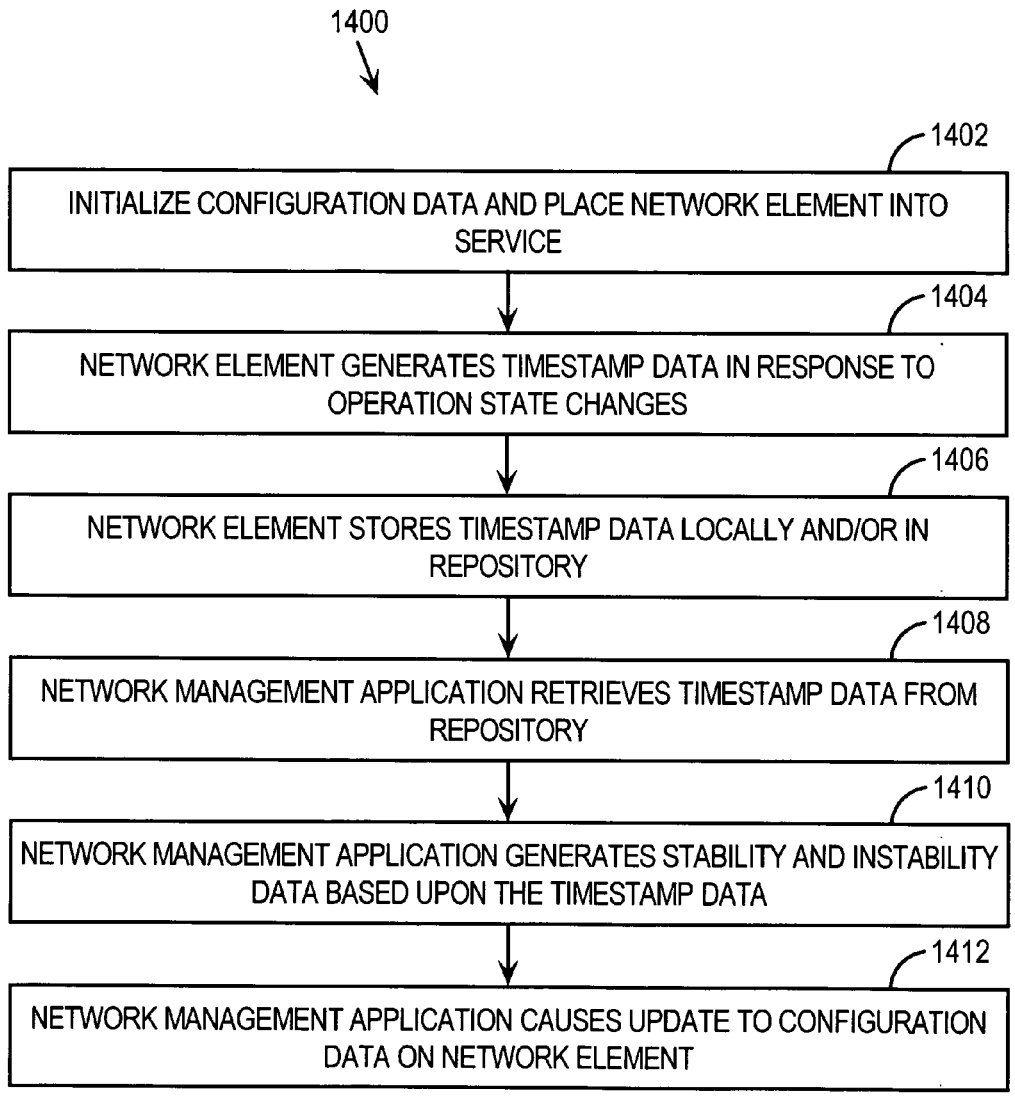
FIG. 14 is a flow diagram that depicts an approach for characterizing the dynamic availability behavior of network element according to one embodiment of the invention.

FIG. 14 is a flow diagram 1400 that depicts an approach for characterizing the dynamic availability behavior of network element 1304 according to one embodiment of the invention. The process flow depicted in FIG. 14 does not have to occur in the particular order depicted in FIG. 14 and may vary, depending upon the requirements of a particular application. Particular applications may also not include one or more steps depicted in FIG. 14 and may include additional steps not depicted in FIG. 14.

In step 1402, network element 1304 is initialized with an initial set of values and network element 1304 is placed into service. In step 1404, network element 1304 generates timestamp data in response to detecting operational state change events and in accordance with configuration data 1314. In step 1406, network element 1304 stores the timestamp data locally and/or provides the timestamp data to repository 1306 via interfaces 1308. In step 1408, network management application 1302 retrieves the timestamp data from repository 1306. In step 1410, network management application 1302 generates stability and instability data based upon the timestamp data, as described herein. In step 1412, network management application 1302 causes configuration data 1314 to be updated. This may occur for a variety of reasons, such as a change in external constraints or business policy.

9.0 Implementation Mechanisms—Hardware Overview

Figure 15:
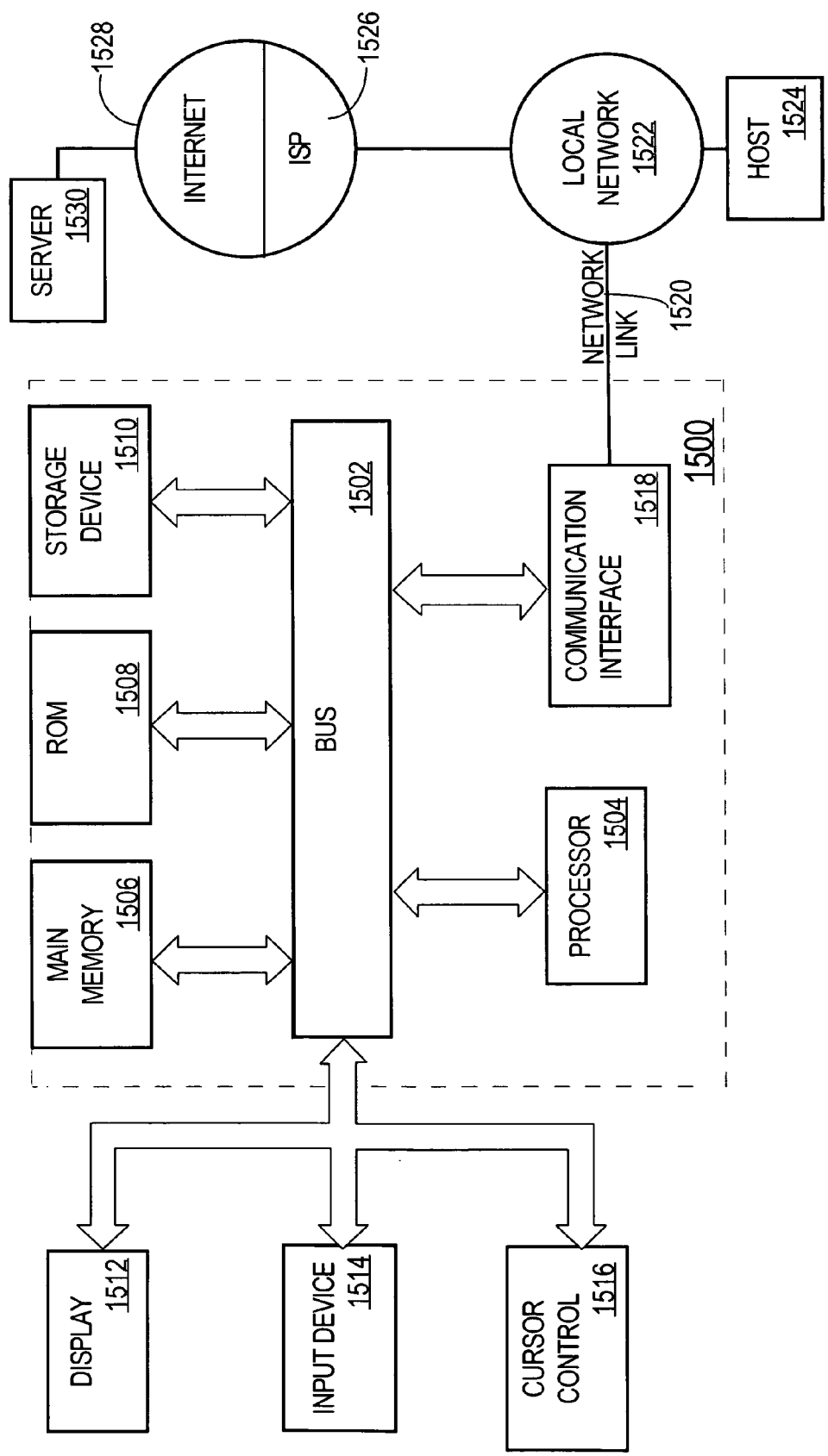
FIG. 15 is a block diagram that illustrates a computer system upon which an embodiment of the invention may be implemented.

FIG. 15 is a block diagram that illustrates a general-purpose computer system 1500 upon which an embodiment of the invention may be implemented. Computer system 1500 includes a bus 1502 or other communication mechanism for communicating information, and a processor 1504 coupled with bus 1502 for processing information. Computer system 1500 also includes a main memory 1506, such as a random access memory ("RAM") or other dynamic storage device, coupled to bus 1502 for storing information and instructions to be executed by processor 1504. Main memory 1506 also may be used for storing temporary variables or other intermediate information during execution of instructions to be executed by processor 1504. Computer system 1500 further includes a read only memory ("ROM") 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube ("CRT"), for displaying information to a computer user. An input device 1514, including alphanumeric and other keys, is coupled to bus 1502 for communicating information and command selections to processor 1504. Another type of user input device is cursor control 1516, such as a mouse, trackball, stylus, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

The invention is related to the use of computer system 1500 for re-authenticating computing devices. According to one embodiment of the invention, re-authenticating computing devices is provided by computer system 1500 in response to processor 1504 executing one or more sequences of one or more instructions contained in main memory 1506. Such instructions may be read into main memory 1506 from another computer-readable medium, such as storage device 1510. Execution of the sequences of instructions contained in main memory 1506 causes processor 1504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1504 for execution. Such a medium may take many forms, including but not limited to, non-volatile media, volatile media, and transmission media. Non-volatile media includes, for example, optical or magnetic disks, such as storage device 1510. Volatile media includes dynamic memory, such as main memory 1506. Transmission media includes coaxial cables, copper wire and fiber optics, including the wires that comprise bus 1502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1504 for execution. For example, the instructions may initially be carried on a magnetic disk of a remote computer. The remote computer can load the instructions into its dynamic memory and send the instructions over a telephone line using a modem. A modem local to computer system 1500 can receive the data on the telephone line and use an infrared transmitter to convert the data to an infrared signal. An infrared detector can receive the data carried in the infrared signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network ("ISDN") card or a modem to provide a data communication connection to a corresponding type of telephone line. As another example, communication interface 1518 may be a local area network ("LAN") card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider ("ISP") 326. ISP 1526 in turn provides data communication services through the worldwide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are exemplary forms of carrier waves transporting the information.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. In accordance with the invention, one such downloaded application provides for re-authenticating computing devices as described herein.

The received code may be executed by processor 1504 as it is received, and/or stored in storage device 1510, or other non-volatile storage for later execution. In this manner, computer system 1500 may obtain application code in the form of a carrier wave.

10.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for load balancing, comprising:
receiving resource availability profiles including:
a first resource availability profile comprising a first plurality of parameters for a first resource associated with a first server, and
a second resource availability profile comprising a second plurality of parameters for a second resource associated with a second server;
wherein the first server is not the second server;
storing a plurality of policies including a policy comprising a comparison of:
one or more parameters in the first resource availability profile for the first resource, and
one or more parameters in the second resource availability profile for the second resource;
assigning a first weight for the first resource and a second weight for the second resource, wherein the assigning is based at least in part on the policy, one or more values for the one or more parameters from the first resource availability profile and one or more values for the one or more parameters from the second resource availability profile;
determining that the policy of the plurality of policies, but not other policies of the plurality of policies, corresponds to a particular context associated with a particular connection request;
wherein the particular context associated with the particular connection request comprises a requirement for the particular connection request; and
selecting the first server for the particular connection request based at least in part on the first weight and the second weight;
wherein the plurality of policies includes different policies that compare different parameters, and the different policies are applied for different connection requests based on different contexts comprising different requirements for the different connection requests;
wherein the steps of receiving, storing, assigning, determining, and selecting are performed by one or more processors.

2. A method as recited in claim 1, wherein at least one of the resource availability profiles comprises an asymptotic availability.

3. A method as recited in claim 2, wherein the asymptotic availability is a measure that specifies, for a resource described in the at least one resource availability profile, a probability of availability as time approaches infinity for a function that describes the availability of the resource described in the at least one resource availability profile over time.

4. A method as recited in claim 1, wherein at least one of the resource availability profiles comprises a current availability.

5. A method as recited in claim 4, wherein the current availability comprises a current real availability value.

6. A method as recited in claim 4, wherein the current availability comprises a minimum availability.

7. A method as recited in claim 4, wherein the current availability comprises a trend indicator.

8. A method as recited in claim 1, wherein at least one of the resource availability profiles comprises a dynamic real-time availability.

9. A method as recited in claim 8, wherein the dynamic real-time availability comprises a stability index that indicates how long an operational state holds with respect to a prior operational state.

10. A method as recited in claim 8, wherein the dynamic real-time availability comprises an instability index that indicates how quickly a resource changes operational states based upon the magnitude of the interval separating consecutive rapid event occurrences.

11. A method as recited in claim 8, wherein the dynamic real-time availability comprises a repetition index.

12. A method as recited in claim 8, wherein the dynamic real-time availability comprises a multiplicity index.

13. A method as recited in claim 1, wherein at least one of the resource availability profiles further comprises a number of connections.

14. A method as recited in claim 1, wherein at least one of the resource availability profiles further comprises a security level that specifies a security level of a resource described in the at least one resource availability profile.

15. A method as recited in claim 1, wherein at least one of the resource availability profiles is transmitted to a load balancer in response to a change to the at least one resource availability profile.

16. A method as recited in claim 1, wherein at least one of the resource availability profiles is transmitted to a load balancer in response to a request from the load balancer for the at least one resource availability profile.

17. A method as recited in claim 1, wherein the selecting the first server comprises determining that the first resource availability profile satisfies a condition for a client request.

18. A method as recited in claim 1, further comprising determining if the first resource availability profile still conforms to a client condition after receiving a change to the first resource availability profile.

19. A method as recited in claim 18 further comprising, in response to a determination that the first resource availability profile no longer conforms to the client condition, removing a client request from a queue of requests to be sent to the first server.

20. The method of claim 1, wherein the requirement for the particular connection request is a particular requirement, specified by the particular connection request, of a particular application; wherein the different connection requests are in support of different applications with different requirements, wherein determining that the policy of the plurality of policies corresponds to the particular context associated with the particular connection request comprises determining that the policy corresponds to the particular requirement.

21. An apparatus for load balancing connections to servers, the apparatus comprising:
  first storage that holds resource availability profiles including:
    a first resource availability profile comprising a first plurality of parameters for a first resource associated with a first server, and
    a second resource availability profile comprising a second plurality of parameters for a second resource associated with a second server;
  wherein the first server is not the second server;
  second storage that holds a server rotation pool comprising a first identifier for the first server and a second identifier for the second server;
  third storage that holds a plurality of policies including a policy comprising a comparison of:
    one or more parameters in the first resource availability profile for the first resource, and
    one or more parameters in the second resource availability profile for the second resource;
  logic for assigning a first weight for the first resource and a second weight for the second resource, wherein the assigning is based at least in part on the policy, one or more values for the one or more parameters in the first resource availability profile and one or more values for the one or more parameters in the second resource availability profile;
  logic for determining that the policy of the plurality of policies, but not other policies of the plurality of policies, corresponds to a particular context associated with a particular connection request;
  wherein the particular context associated with the particular connection request comprises a requirement for the particular connection request; and
  load balancing logic coupled to the first storage and the second storage for selecting the first server for the particular connection request based at least in part on the first weight and the second weight;
  wherein the plurality of policies includes different policies that compare different parameters, and the different policies are applied for different connection requests based on different contexts comprising different requirements for the different connection requests.

22. The apparatus of claim 21, wherein at least one of the resource availability profiles comprises an asymptotic availability.

23. The apparatus of claim 21, wherein the asymptotic availability is a measure that specifies, for a resource described in the at least one resource availability profile, a probability of availability as time approaches infinity for a function that describes the availability of the resource described in the at least one resource availability profile over time.

24. The apparatus of claim 21, wherein at least one of the resource availability profiles comprises a current availability.

25. The apparatus of claim 21, wherein at least one of the resource availability profiles comprises a dynamic real-time availability.

26. The apparatus of claim 25, wherein the dynamic real-time availability comprises a stability index that indicates how long an operational state holds with respect to a prior operational state.

27. The apparatus of claim 25, wherein the dynamic real-time availability comprises an instability index that indicates how quickly a resource changes operational states based upon the magnitude of the interval separating consecutive rapid event occurrences.

28. The apparatus of claim 25, wherein the dynamic real-time availability comprises a repetition index.

29. The apparatus of claim 25, wherein the dynamic real-time availability comprises a multiplicity index.

30. The apparatus of claim 25, wherein the dynamic real-time availability comprises a multiplicity index.

31. The apparatus of claim 21, wherein the load balancing logic is further able to select the first server by determining that the first resource availability profile satisfies a condition for a client request.

32. The apparatus of claim 21, wherein the load balancing logic is further able to determine if the first resource availability profile still conforms to a client condition after receiving a change to the first resource availability profile.

33. The apparatus of claim 32, wherein the load balancing logic is further able to remove a client request from a queue of requests to be sent to the first server in response to a determination that the first resource availability profile no longer conforms to the client condition.

34. The apparatus of claim 21, wherein the requirement for the particular connection request is a particular requirement, specified by the particular connection request, of a particular application; wherein the different connection requests are in support of different applications with different requirements, wherein determining that the policy of the plurality of policies corresponds to the particular context associated with the particular connection request comprises determining that the policy corresponds to the particular requirement.

35. A non-transitory computer-readable storage medium storing one or more sequences of instructions which, when executed by one or more processors, cause:
  receiving resource availability profiles including:
    a first resource availability profile comprising a first plurality of parameters for a first resource associated with a first server, and
    a second resource availability profile comprising a second plurality of parameters for a second resource associated with a second server;
  wherein the first server is not the second server;
  storing a plurality of policies including a policy comprising a comparison of:
    one or more parameters in the first resource availability profile for the first resource, and
    one or more parameters in the second resource availability profile for the second resource;
  assigning a first weight for the first resource and a second weight for the second resource, wherein the assigning is based at least in part on the policy, one or more values for the one or more parameters from the first resource availability profile and one or more values for the one or more parameters from the second resource availability profile;

determining that the policy of the plurality of policies, but not other policies of the plurality of policies, corresponds to a particular context associated with a particular connection request;

wherein the particular context associated with the particular connection request comprises a requirement for the particular connection request; and selecting the first server for the particular connection request based at least in part on the first weight and the second weight;

wherein the plurality of policies includes different policies that compare different parameters, and the different policies are applied for different connection requests based on different contexts comprising different requirements for the different connection requests.

36. The one or more non-transitory computer-readable storage media of claim 35, wherein at least one of the resource availability profiles comprises an asymptotic availability.

37. The one or more non-transitory computer-readable storage media of claim 36, wherein the asymptotic availability is a measure that specifies, for a resource described in the at least one resource availability profile, a probability of availability as time approaches infinity for a function that describes the availability of the resource described in the at least one resource availability profile over time.

38. The one or more non-transitory computer-readable storage media of claim 35, wherein at least one of the resource availability profiles comprises a current availability.

39. The one or more non-transitory computer-readable storage media of claim 35, wherein at least one of the resource availability profiles comprises a dynamic real-time availability.

40. The one or more non-transitory computer-readable storage media of claim 39, wherein the dynamic real-time availability comprises a stability index that indicates how long an operational state holds with respect to a prior operational state.

41. The one or more non-transitory computer-readable storage media of claim 39, wherein the dynamic real-time availability comprises an instability index that indicates how quickly a resource changes operational states based upon the magnitude of the interval separating consecutive rapid event occurrences.

42. The one or more non-transitory computer-readable storage media of claim 39, wherein the dynamic real-time availability comprises a repetition index.

43. The one or more non-transitory computer-readable storage media of claim 35, wherein the one or more sequences of instructions cause selecting the first server by determining that the first resource availability profile satisfies a condition for a client request.

44. The one or more non-transitory computer-readable storage media of claim 35, wherein the one or more sequences of instructions further cause determining if the first resource availability profile still conforms to a client condition after receiving a change to the first resource availability profile.

45. The one or more non-transitory computer-readable storage media of claim 44, wherein the one or more sequences of instructions further cause removing a client request from a queue of requests to be sent to the first server in response to a determination that the first resource availability profile no longer conforms to the client condition.

46. The one or more non-transitory computer-readable storage media of claim 35, wherein the requirement for the particular connection request is a particular requirement, specified by the particular connection request, of a particular application; wherein the different connection requests are in support of different applications with different requirements, wherein determining that the policy of the plurality of policies corresponds to the particular context associated with the particular connection request comprises determining that the policy corresponds to the particular requirement.

* * * * *